Oct. 27, 1953

J. H. HACKENBERG 2,657,259

FACSIMILE TRANSMITTER

Filed Oct. 19, 1949

INVENTOR.
J. H. HACKENBERG
BY
A. A. Thomas
ATTORNEY

Oct. 27, 1953

J. H. HACKENBERG 2,657,259

FACSIMILE TRANSMITTER

Filed Oct. 19, 1949

INVENTOR.
J. H. HACKENBERG

Oct. 27, 1953    J. H. HACKENBERG    2,657,259
FACSIMILE TRANSMITTER
Filed Oct. 19, 1949    16 Sheets-Sheet 3

INVENTOR.
J. H. HACKENBERG
BY
A. A. Thomas
ATTORNEY

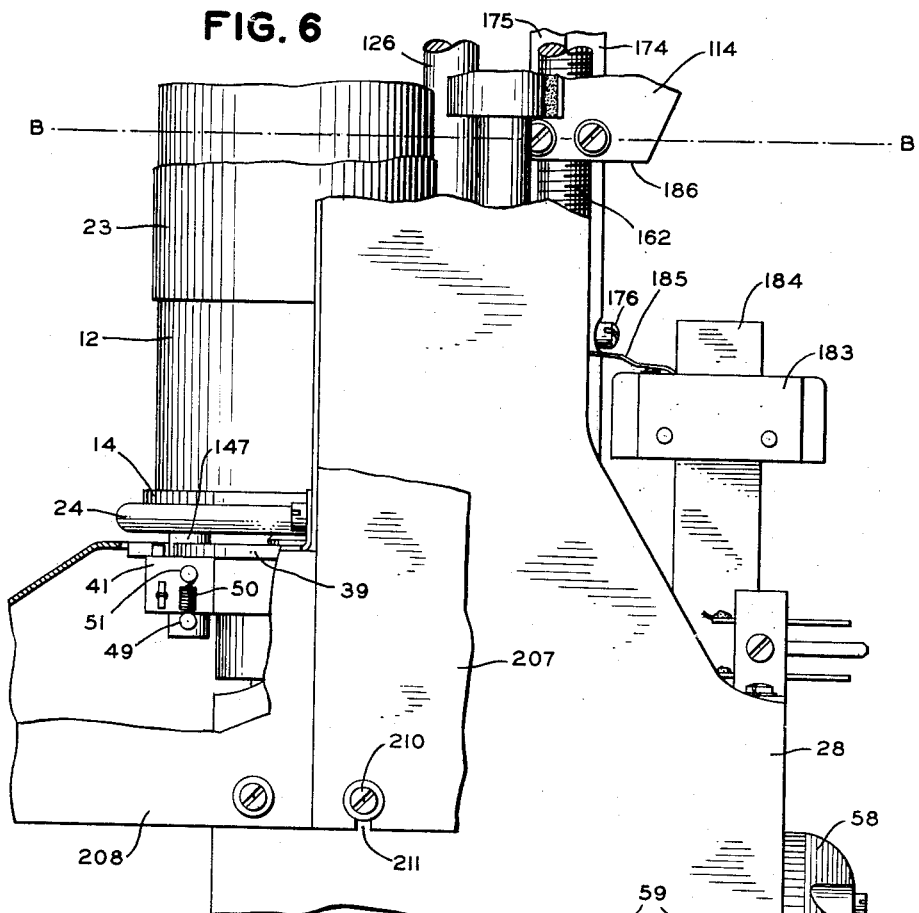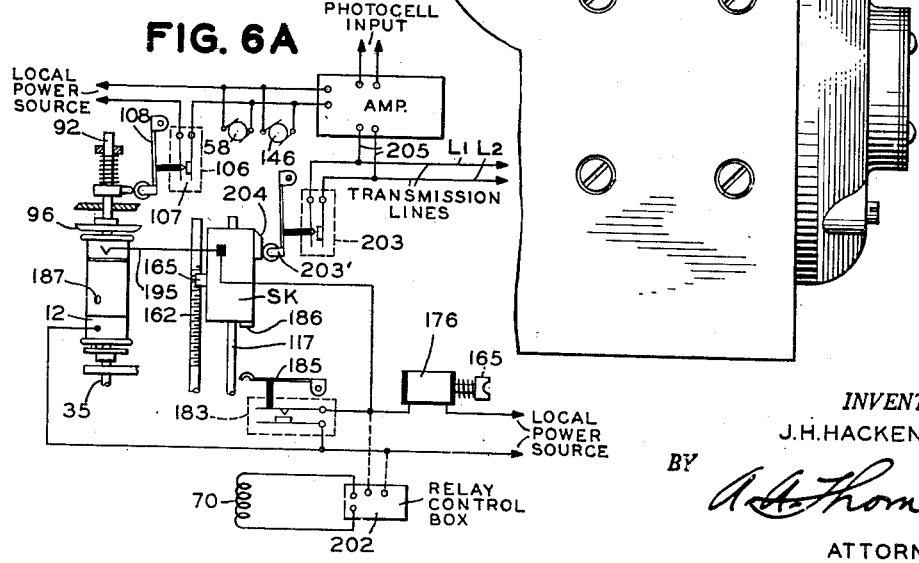

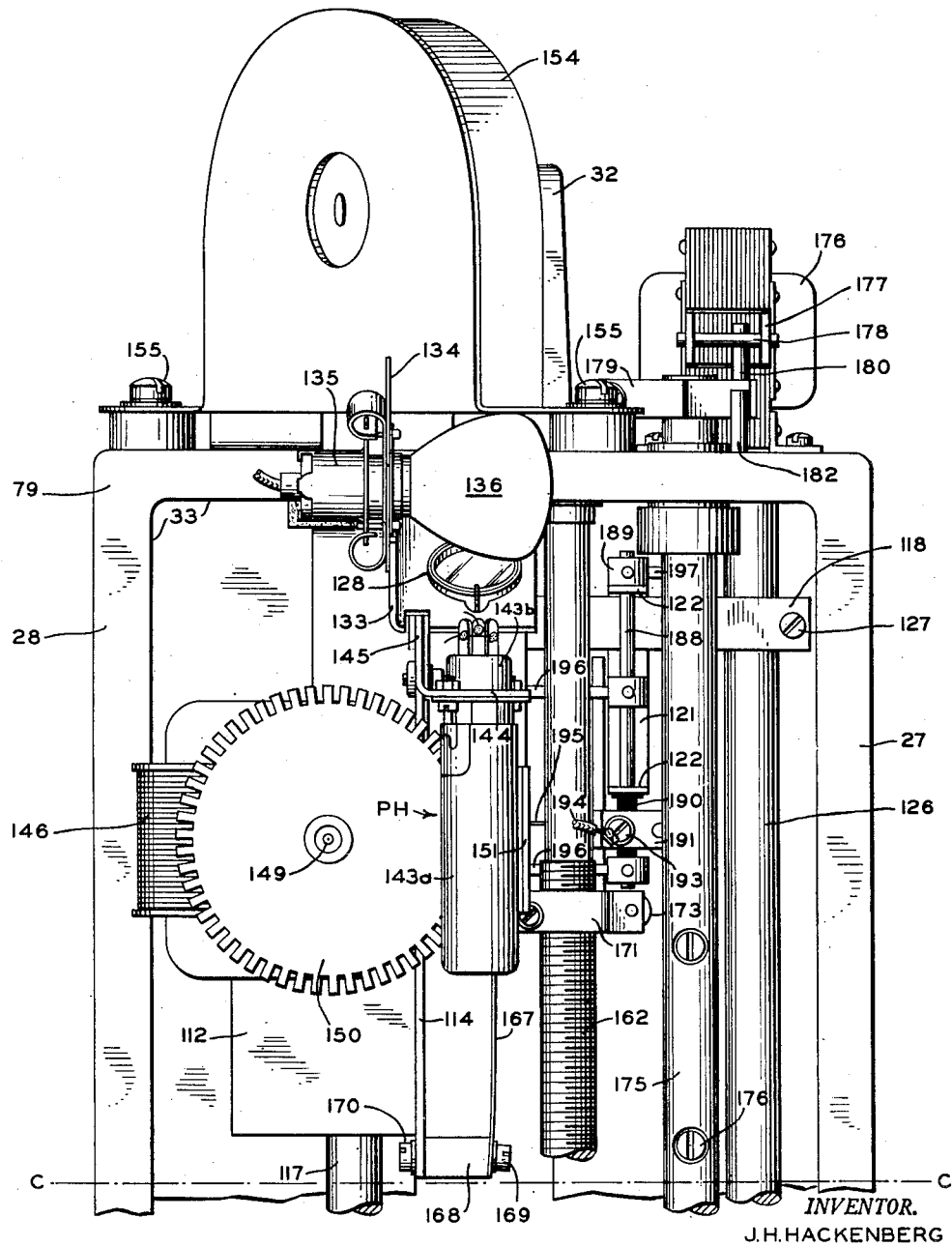

Oct. 27, 1953

J. H. HACKENBERG 2,657,259

FACSIMILE TRANSMITTER

Filed Oct. 19, 1949

INVENTOR.
J. H. HACKENBERG

BY
*A. H. Thomas*

ATTORNEY

Oct. 27, 1953 J. H. HACKENBERG 2,657,259
FACSIMILE TRANSMITTER
Filed Oct. 19, 1949 16 Sheets-Sheet 9

INVENTOR.
J. H. HACKENBERG
BY
ATTORNEY

Oct. 27, 1953

J. H. HACKENBERG 2,657,259

FACSIMILE TRANSMITTER

Filed Oct. 19, 1949

INVENTOR.
J. H. HACKENBERG

BY

ATTORNEY

Oct. 27, 1953  J. H. HACKENBERG  2,657,259
FACSIMILE TRANSMITTER
Filed Oct. 19, 1949  16 Sheets-Sheet 11

INVENTOR.
J. H. HACKENBERG
BY
ATTORNEY

Oct. 27, 1953  J. H. HACKENBERG  2,657,259
FACSIMILE TRANSMITTER
Filed Oct. 19, 1949  16 Sheets-Sheet 12
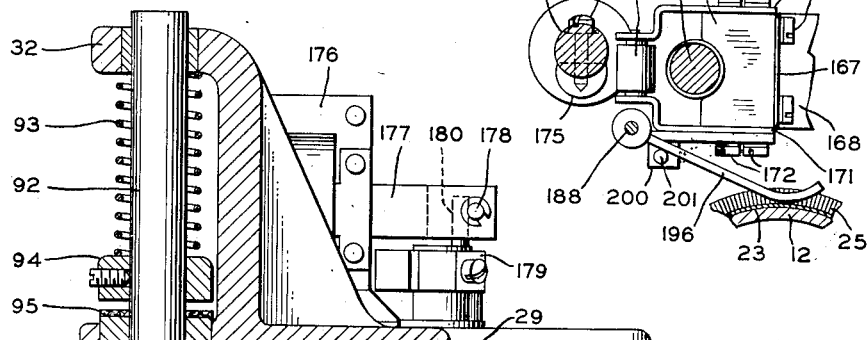
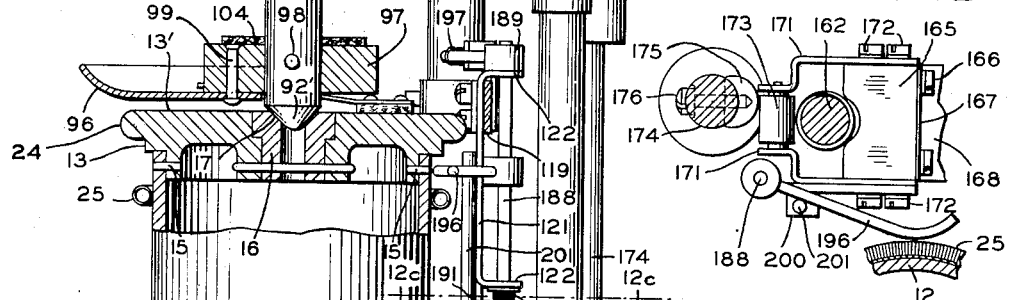
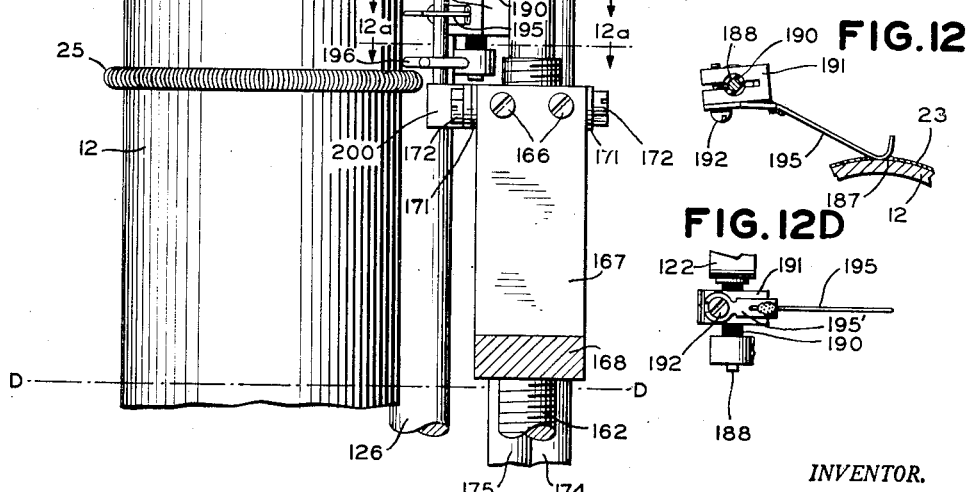
INVENTOR.
J. H. HACKENBERG
BY
*A. H. Thomas*
ATTORNEY Oct. 27, 1953  J. H. HACKENBERG  2,657,259
FACSIMILE TRANSMITTER
Filed Oct. 19, 1949  16 Sheets-Sheet 13

INVENTOR.
J.H.HACKENBERG
BY
ATTORNEY

Oct. 27, 1953 J. H. HACKENBERG 2,657,259
FACSIMILE TRANSMITTER
Filed Oct. 19, 1949 16 Sheets-Sheet 14
FIG.14
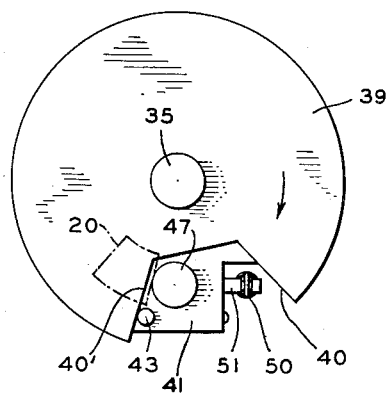
FIG.15
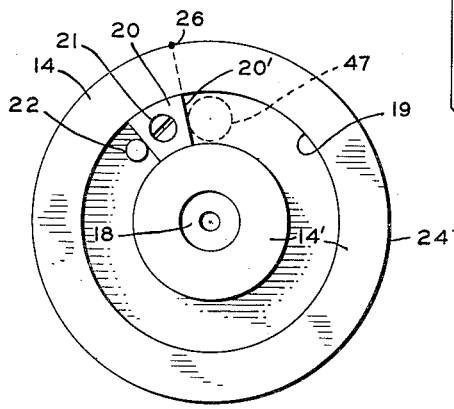
FIG.16
FIG.17
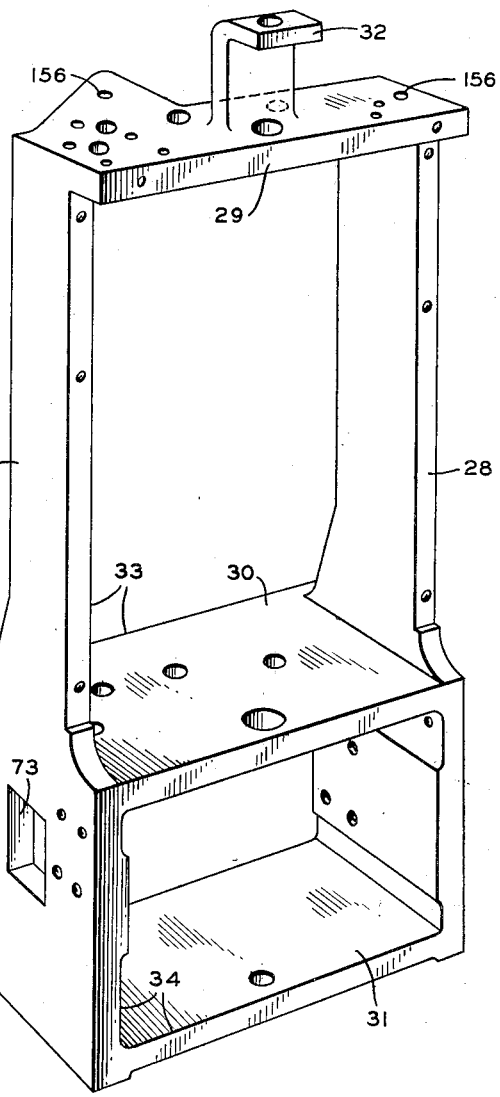
INVENTOR.
J. H. HACKENBERG
BY
ATTORNEY Oct. 27, 1953     J. H. HACKENBERG     2,657,259
FACSIMILE TRANSMITTER
Filed Oct. 19, 1949                             16 Sheets-Sheet 15
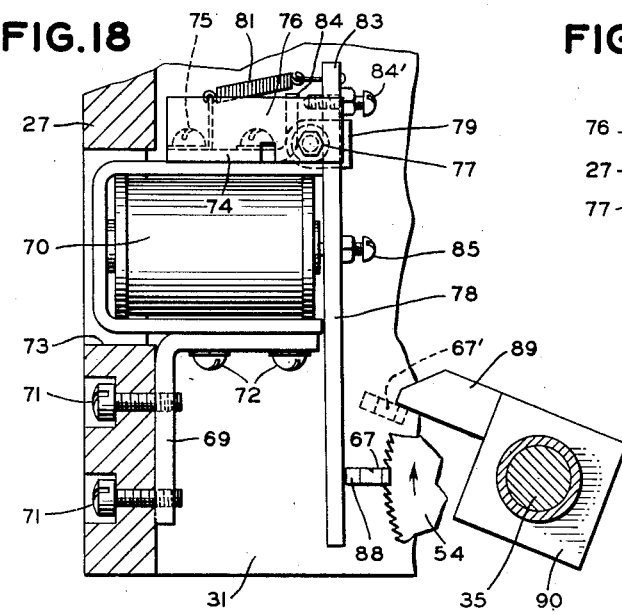
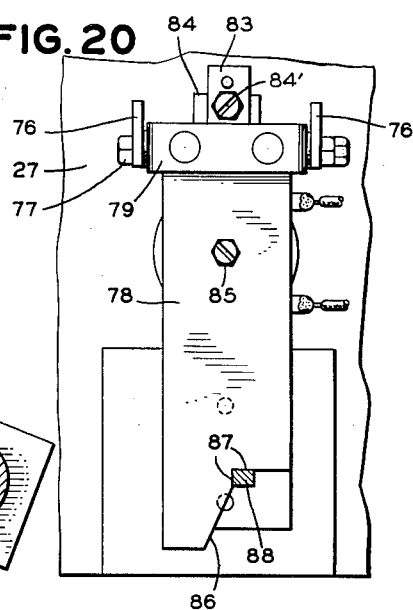
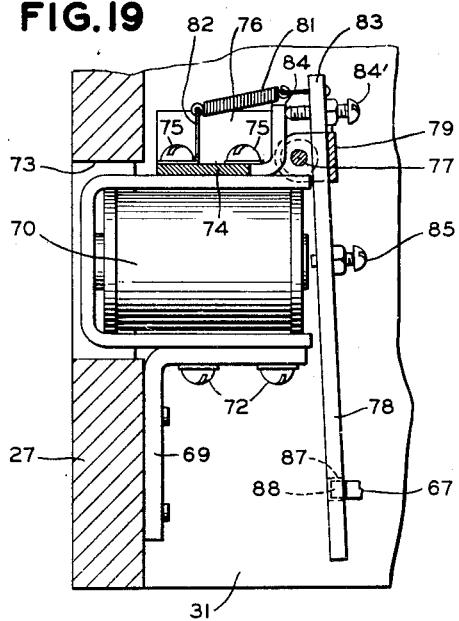
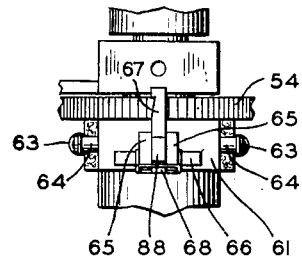
*INVENTOR.*
J. H. HACKENBERG
BY
ATTORNEY Oct. 27, 1953     J. H. HACKENBERG     2,657,259
FACSIMILE TRANSMITTER
Filed Oct. 19, 1949     16 Sheets-Sheet 16
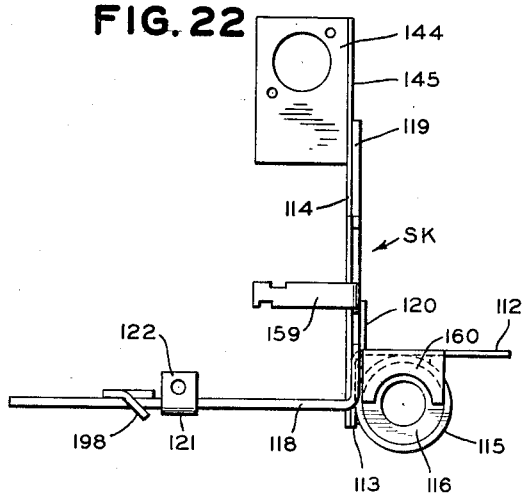
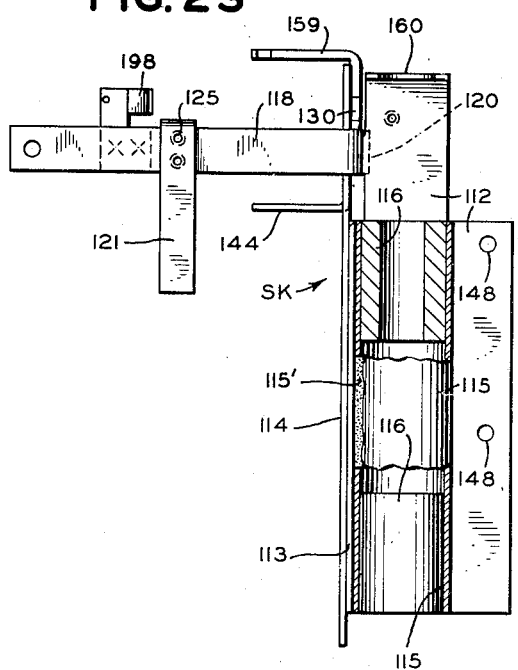
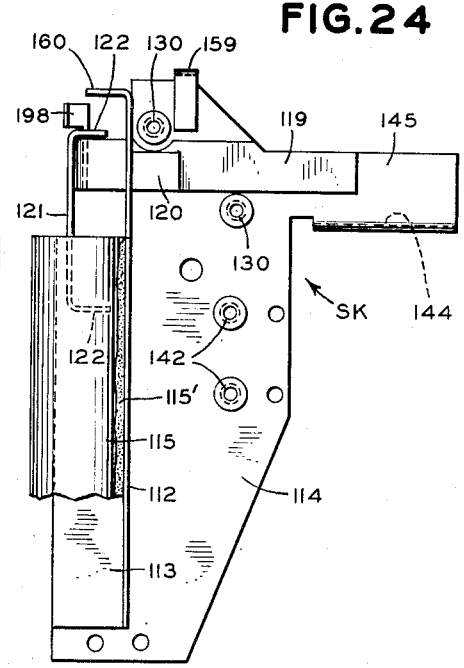
*INVENTOR.*
J. H. HACKENBERG
BY
ATTORNEY Patented Oct. 27, 1953

2,657,259

UNITED STATES PATENT OFFICE 2,657,259

FACSIMILE TRANSMITTER

John H. Hackenberg, Flushing, N. Y., assignor to The Western Union Telegraph Company, New York, N. Y., a corporation of New York Application October 19, 1949, Serial No. 122,326

23 Claims. (Cl. 178—7.1)

My invention is for a novel construction of facsimile transmitter especially adapted for concentrator use in a main telegraph office for sending messages over subscribers' lines to their own facsimile recorders. In a concentrator system of this kind it is desirable to have a number of such transmitters within easy reach of one operator and for this purpose it is neeccsary that the machines have the smallest horizontal dimensions possible.

Accordingly I have developed a transmitter of compact columnar structure in which the general disposition of the various parts is in a vertical direction. One of the important features of this machine is a vertical scanning drum located in a recess at the front and supported in novel mountings which allow a quick and easy insertion and removal of the drum. These mountings for the drum are such that the mere placing of the message carrying drum into scanning position connects it with the driving mechanism of the machine.

The message sheet on the drum is scanned by an optical carriage supported back of the drum for vertical sliding movement and operated by a feed screw geared to the same driving mechanism that rotates the drum. The scanning carriage is connected to the feed screw by a half nut mounted on a spring arm which normally holds the nut pressed against the feed screw. A vertical cam shaft operated by a solenoid disengages the half nut and frees the carriage for quick return upward. This cam shaft performs the additional function of automatically retracting certain parts of the scanning carriage out of the way of the drum during the return of the carriage.

In addition there are certain switches in the machine for automatic operation by the drum and the scanning carriage to enable the machine to carry out its intended function, as will be explained in detail.

Owing to the novel construction, arrangement and operative relation of the parts comprising this machine, the entire apparatus can be mounted on a single narrow frame with a horizontal space of about seven inches wide, so that as many as six machines can be placed side by side for attention by one operator. The practical advantages and various novel features of my invention will be fully understood from a description of the accompanying drawings which illustrate a machine as actually built and operated. In these drawings.

Figure 3:
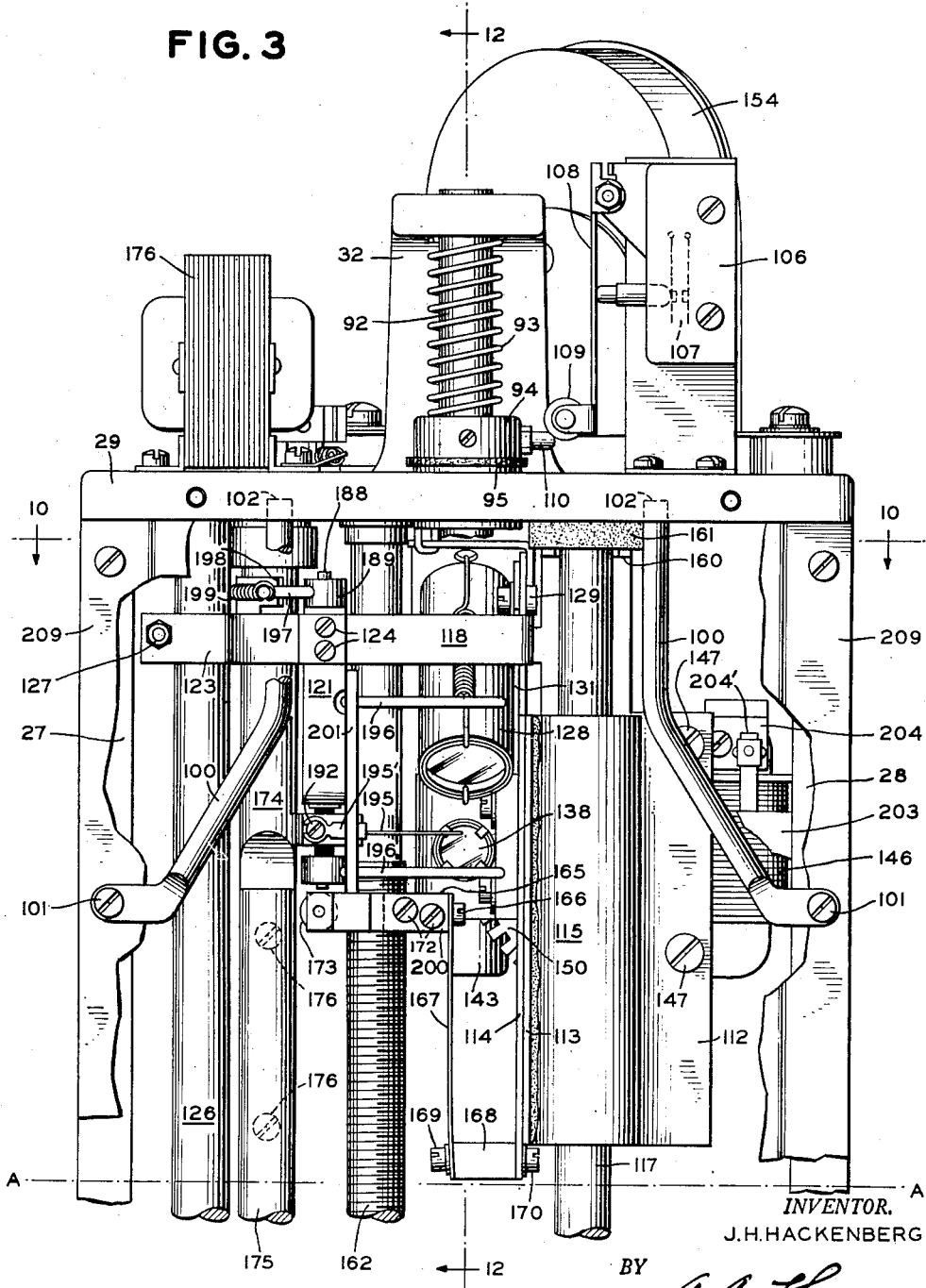
Figure 4:
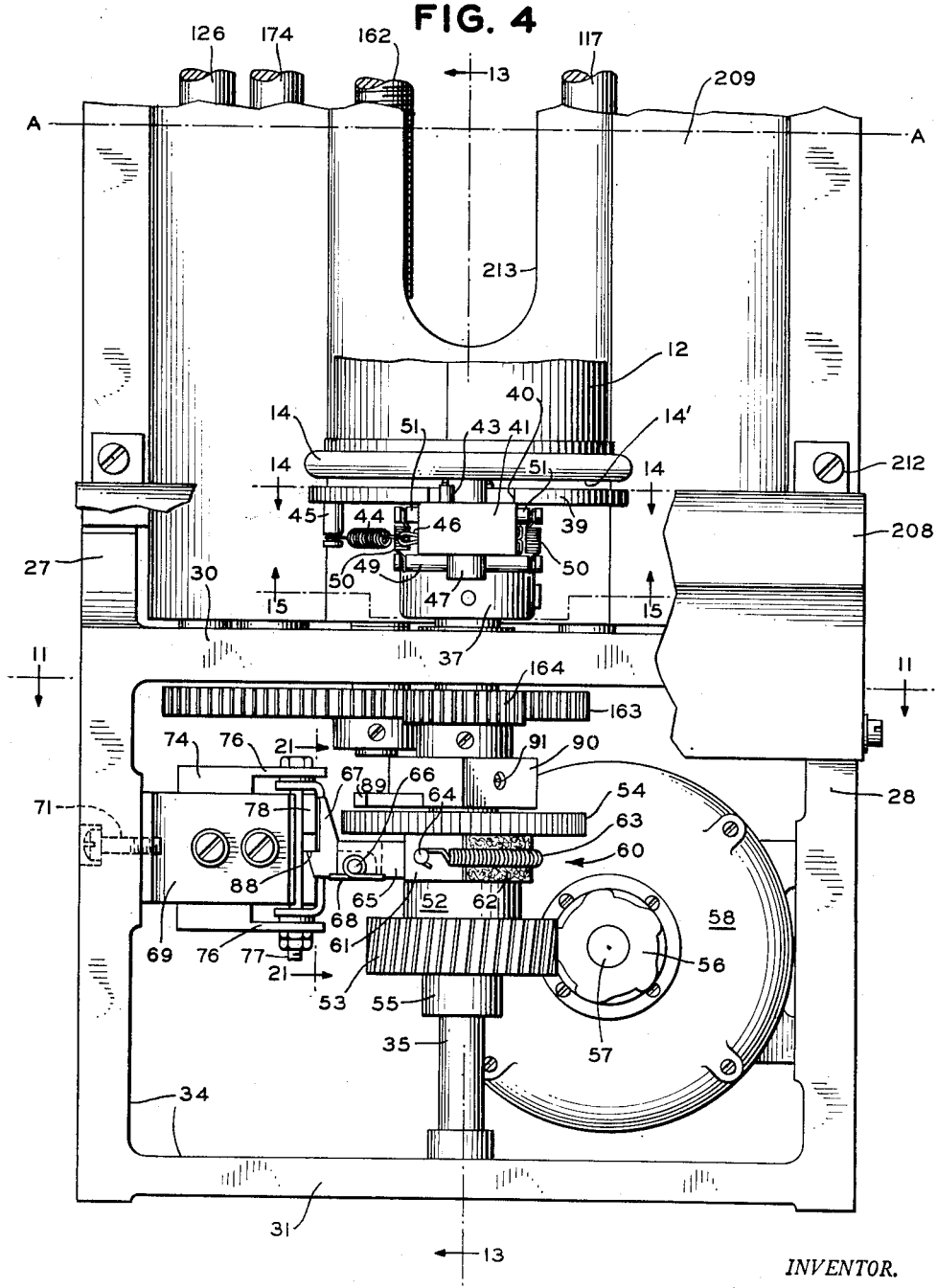
Figure 5:
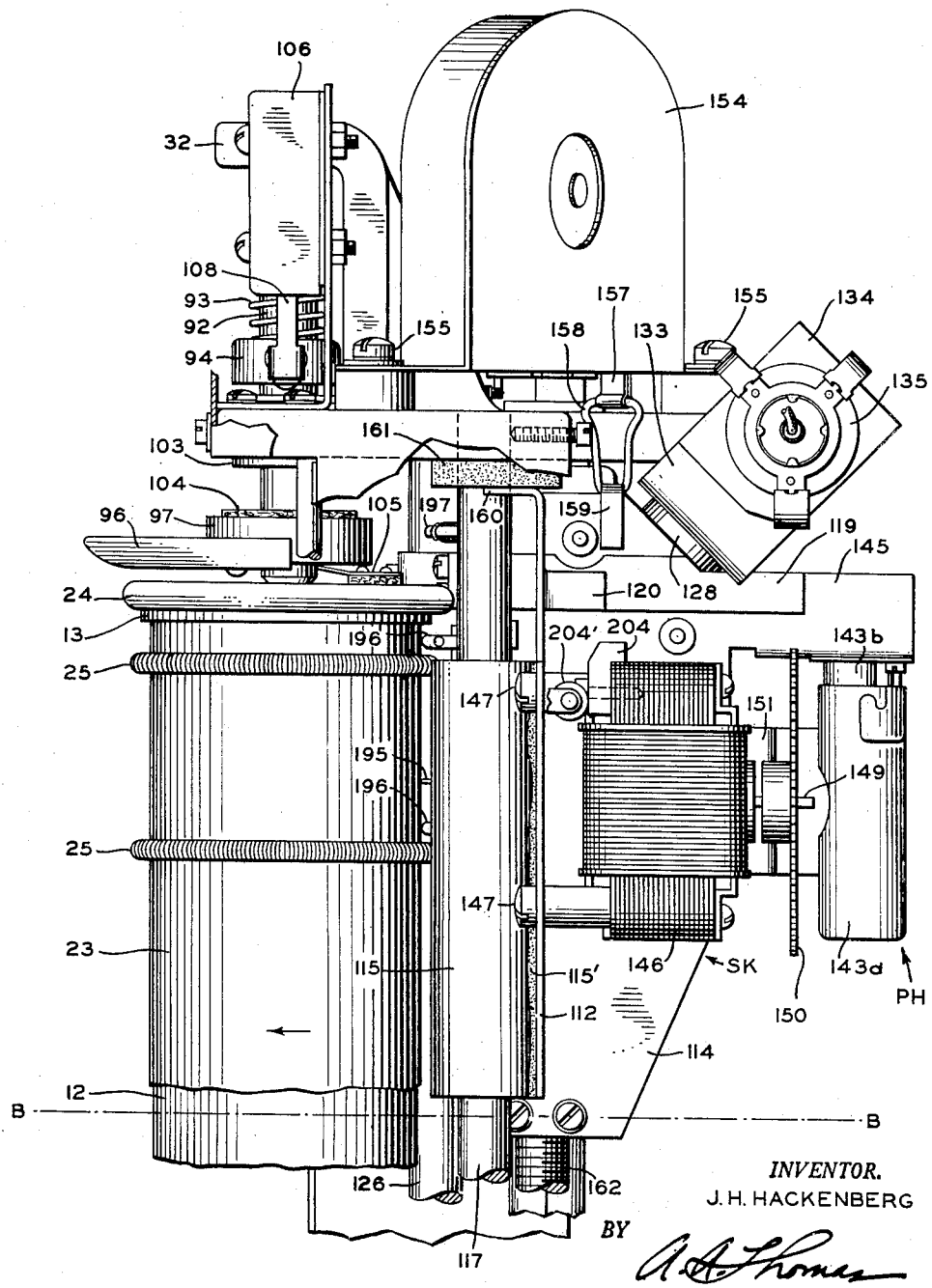
Figure 8:
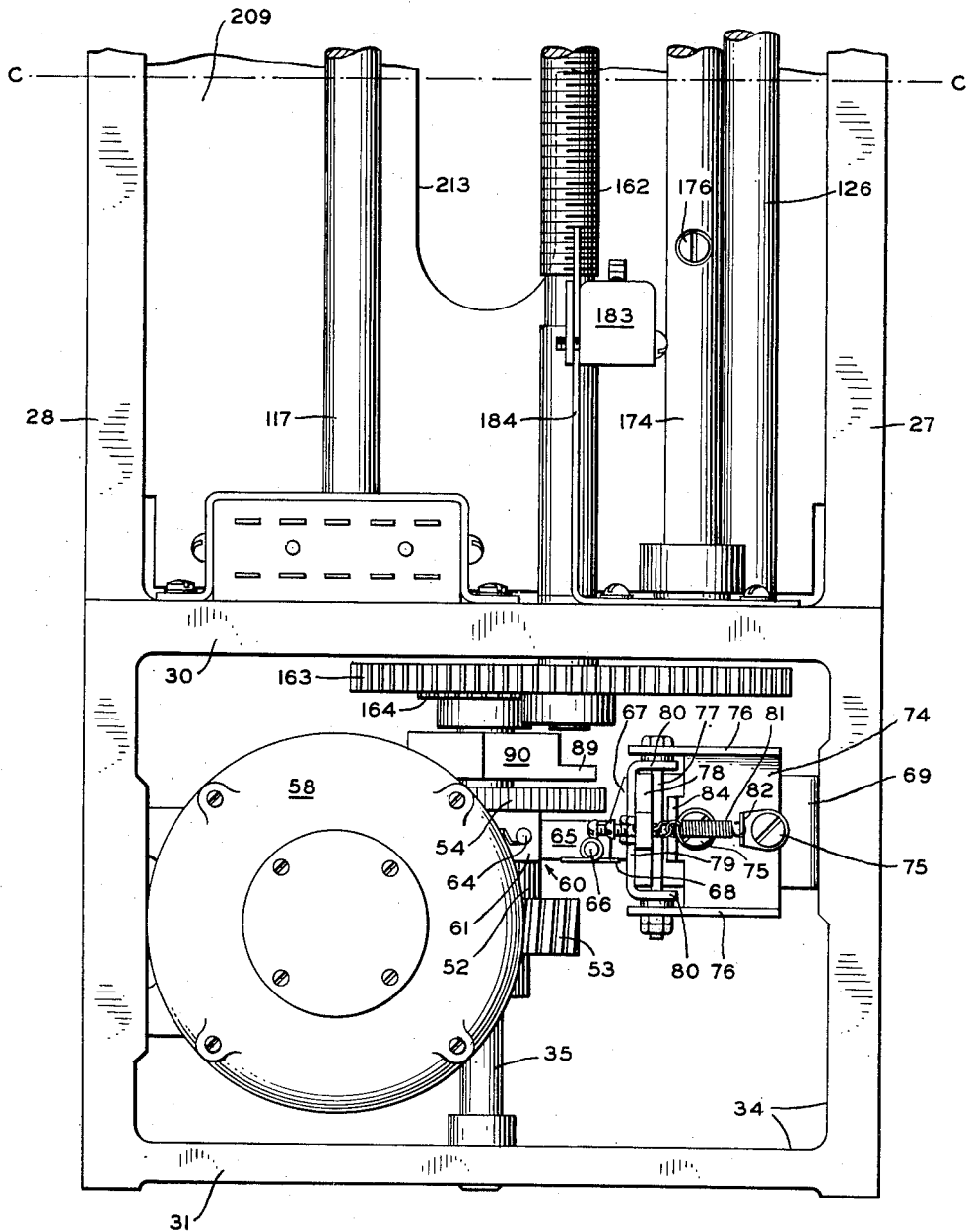
Figure 9:
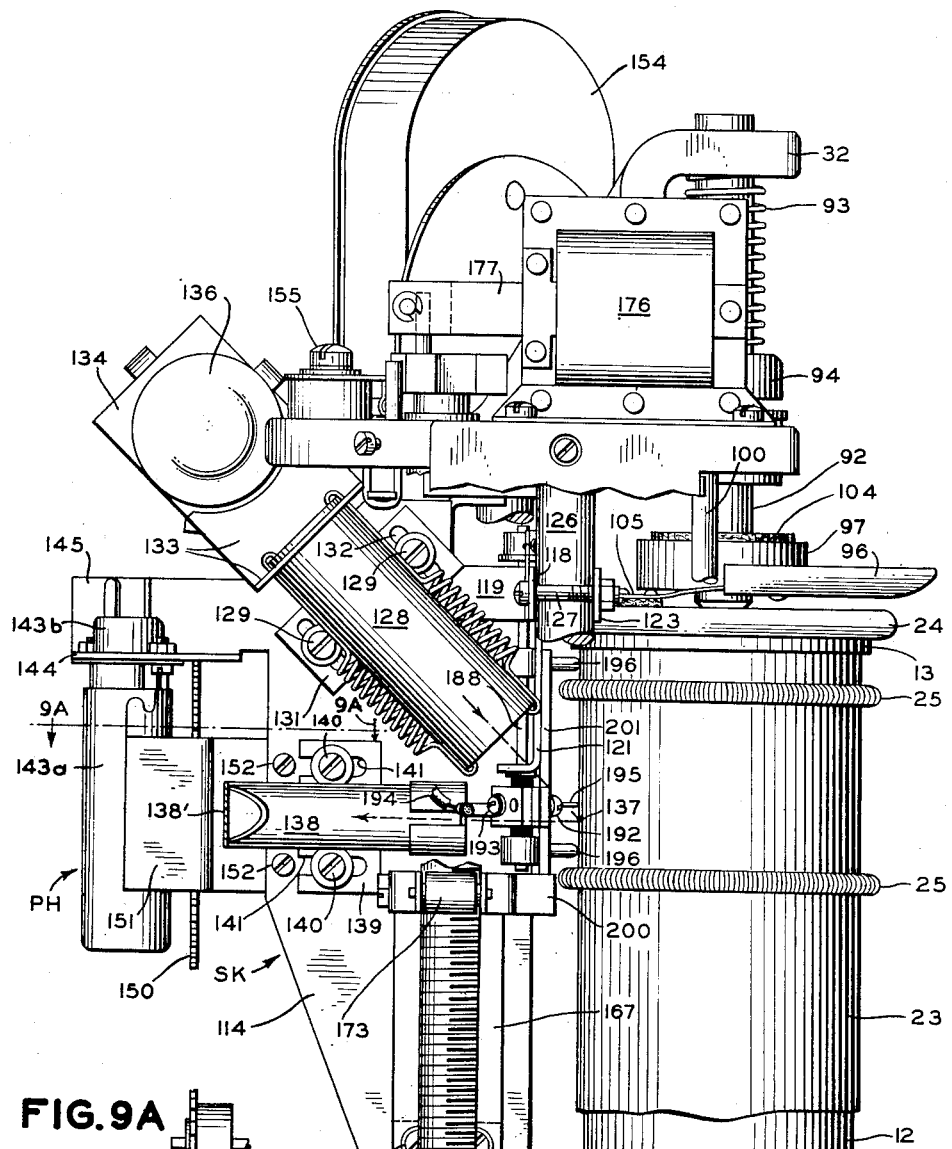
Figure 9A:
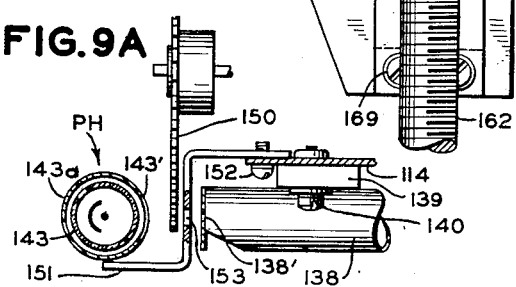
Figure 10:
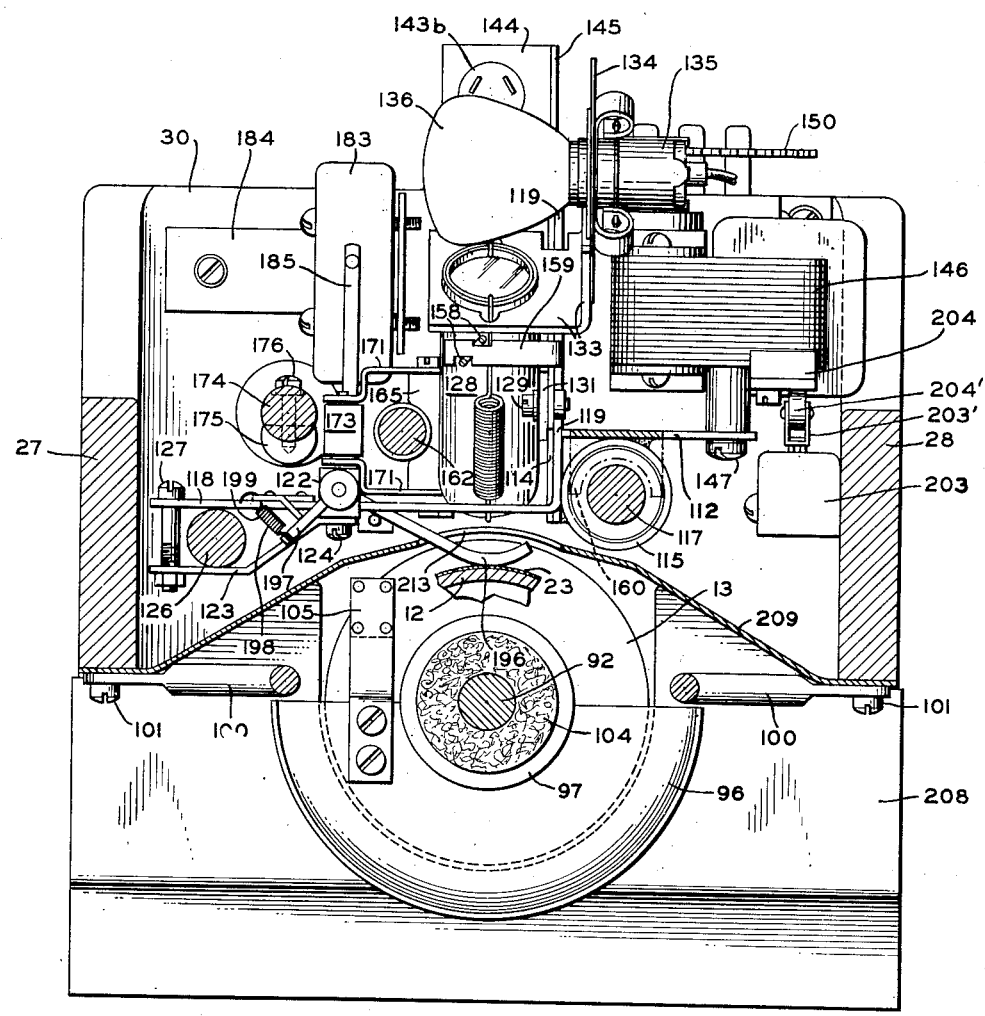
Figure 11:
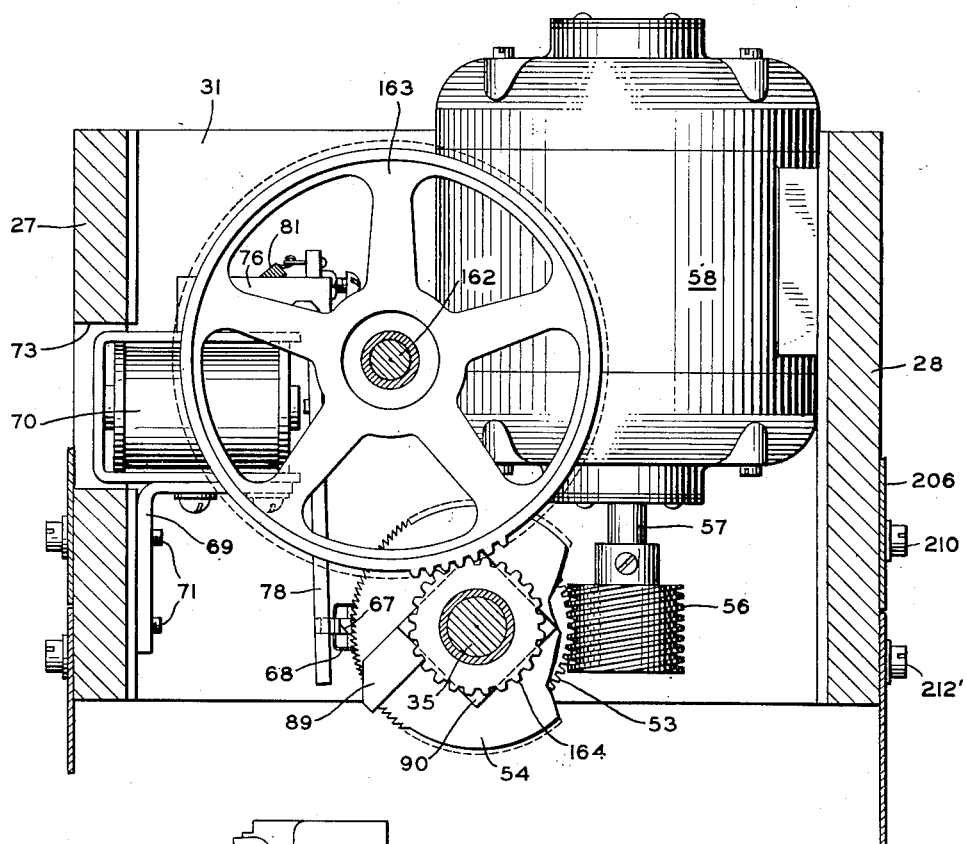
Figure 11A:
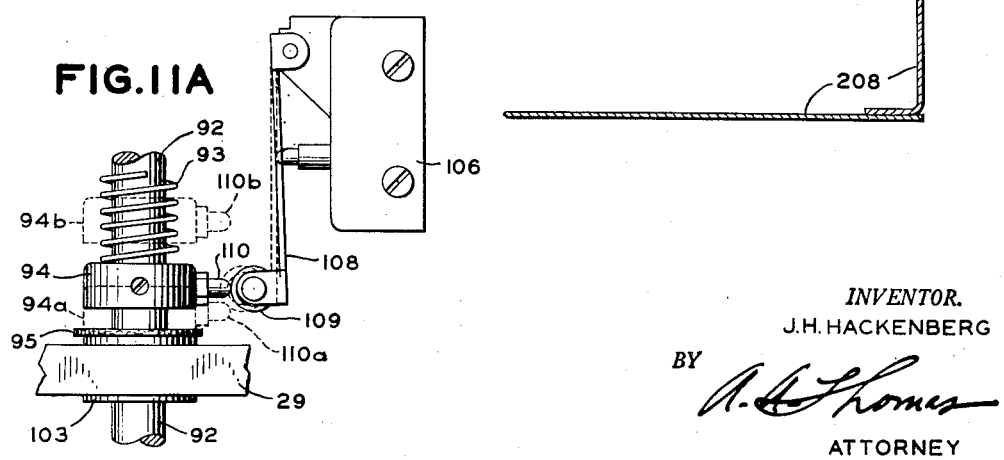
Figure 13:
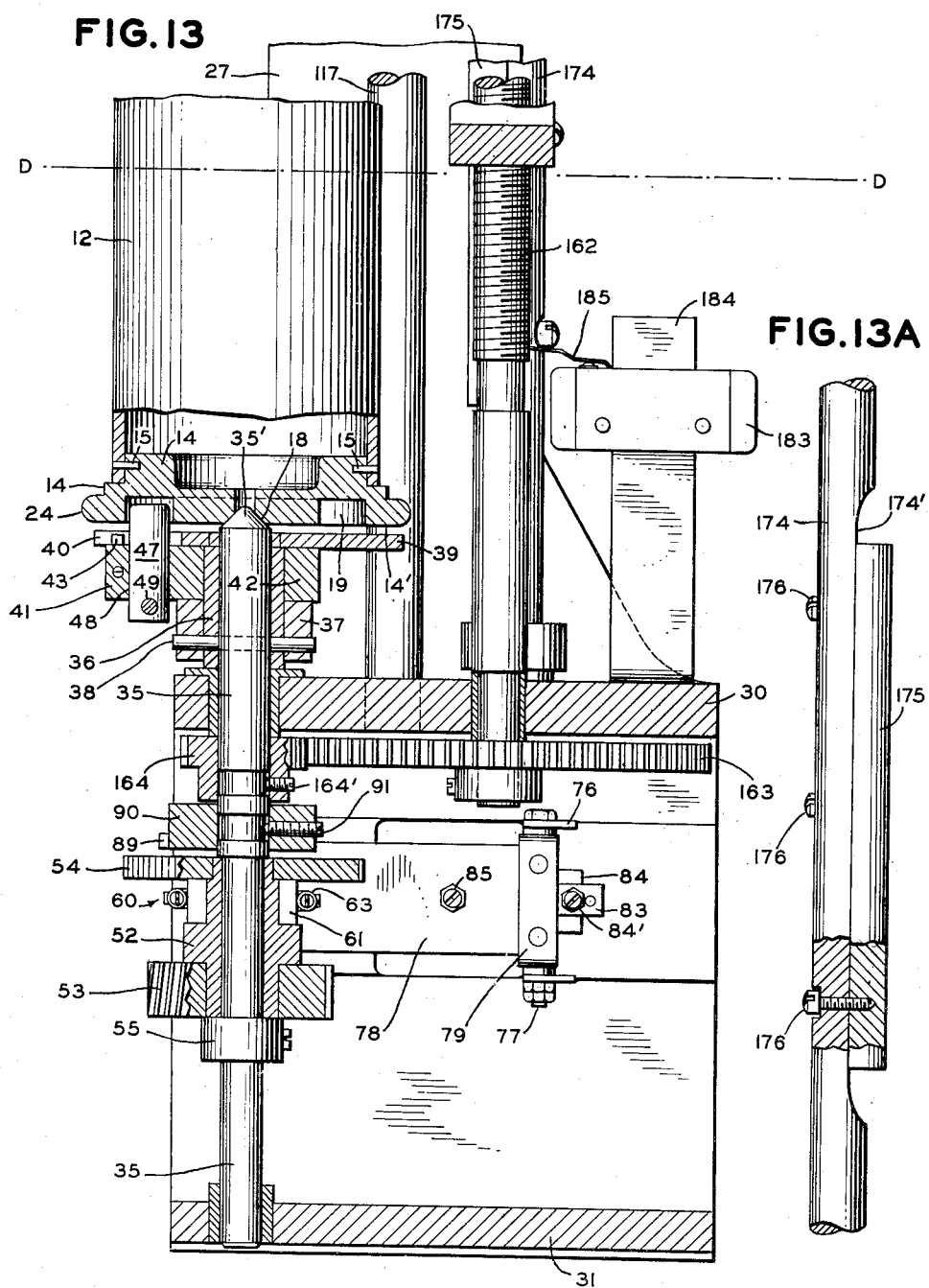
Figure 13A:
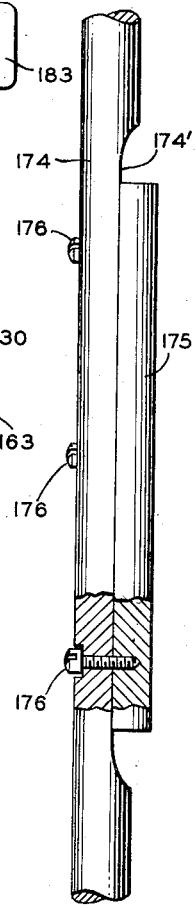

Figs. 3 and 4, which join on line A—A, together represent a front view of the machine, with certain parts in front broken away to reveal the mechanism behind;

Figs. 5 and 6, which join on line B—B, show a side elevation of the machine as seen from the right;

Fig. 6A is a diagram illustrating the circuits controlled by certain automatic switches;

Figs. 7 and 8, which join on line C—C, show a rear view of the machine;

Fig. 9 is a left side view of the upper portion of the machine;

Fig. 9A represents a section on line 9A—9A of Fig. 9;

Fig. 10 shows a plan view sectioned on line 10—10 of Fig. 3;

Fig. 11 is a plan view sectioned on line 11—11 of Fig. 4;

Fig. 11A shows a switch operating detail connected with the upper drum mounting;

Figs. 12 and 13, which join on line D—D, represent a sectional side view of the machine looking from right to left, the section being taken approximately along the lines 12—12 and 13—13 of Figs. 3 and 4, repspectively;

Figs. 12A and 12B are sections on line 12a—12a of Fig. 12, Fig. 12A showing certain parts in normal position and Fig. 12B showing the same parts in operated position;

Fig. 12C is a section on line 12c—12c of Fig. 12;

Fig. 12D is a front view of Fig. 12C without the drum;

Fig. 13A shows the cam shaft that operates the half nut of the scanning carriage;

Figs. 14 and 15 are sectional views on lines 14—14 and 15—15, respectively, of Fig. 4, looking in the direction of the arrows;

Fig. 16 shows the bottom of the scanning drum;

Fig. 17 is a detached perspective of the frame on which all parts of the machine are mounted;

Fig. 18 is a plan view of the phasing magnet assembly with the armature in operative position;

Fig. 19 is a view similar to Fig. 18 with the armature in released position;

Fig. 20 is a side view of Fig. 19 looking from right to left;

Fig. 21 shows a detail on the vertical section line 21—21 of Fig. 4; and

Figs. 22, 23 and 24 show the scanning carriage frame in plan, front and side views, respectively.

As this machine was primarily designed to operate with a vertical scanning drum adapted to be easily inserted and removed, it will be expedient to describe the drum construction first. Referring mainly to Figs. 12 and 13, the drum 12 is a length of tubing provided with end disks 13 and 14 which are secured to the tube in any practical way, as by pins 15. The parts 12, 13 and 14 are usually made of aluminum. The top disk 13 is provided with a central bushing 16 formed with a conical bearing recess 17. The bottom disk 14 (Figs. 13 and 16) has a central pivot socket 18 and an annular groove or channel 19. A drive block 20 is secured in groove 19 by a screw 21 and a fixed pin 22 may be added to engage one side of the block as an abutment. The function of block 20, which is easily replaced when worn, will be explained at the proper time. Let it be noted that the block 20 and pin 22 do not project below the disk 14.

Attention is called to the flat faces of the end disks 13 and 14. That is to say, the upper disk 13 has a flat top 13' and the lower disk 14 has a flat bottom 14' so that the drum can stand upright on either end when out of the machine (see Fig. 1). This is important in the concentrator use of the transmitter, because the operator can load a number of these drums with messages and place them side by side within easy reach for insertion into this or that machine. Furthermore, since the telegram blanks 23 are mounted horizontally on the drum (see Fig. 1), the messages on the loaded drums are in readable position and the operator can instantly pick up the drum she wants.

Figure 1:
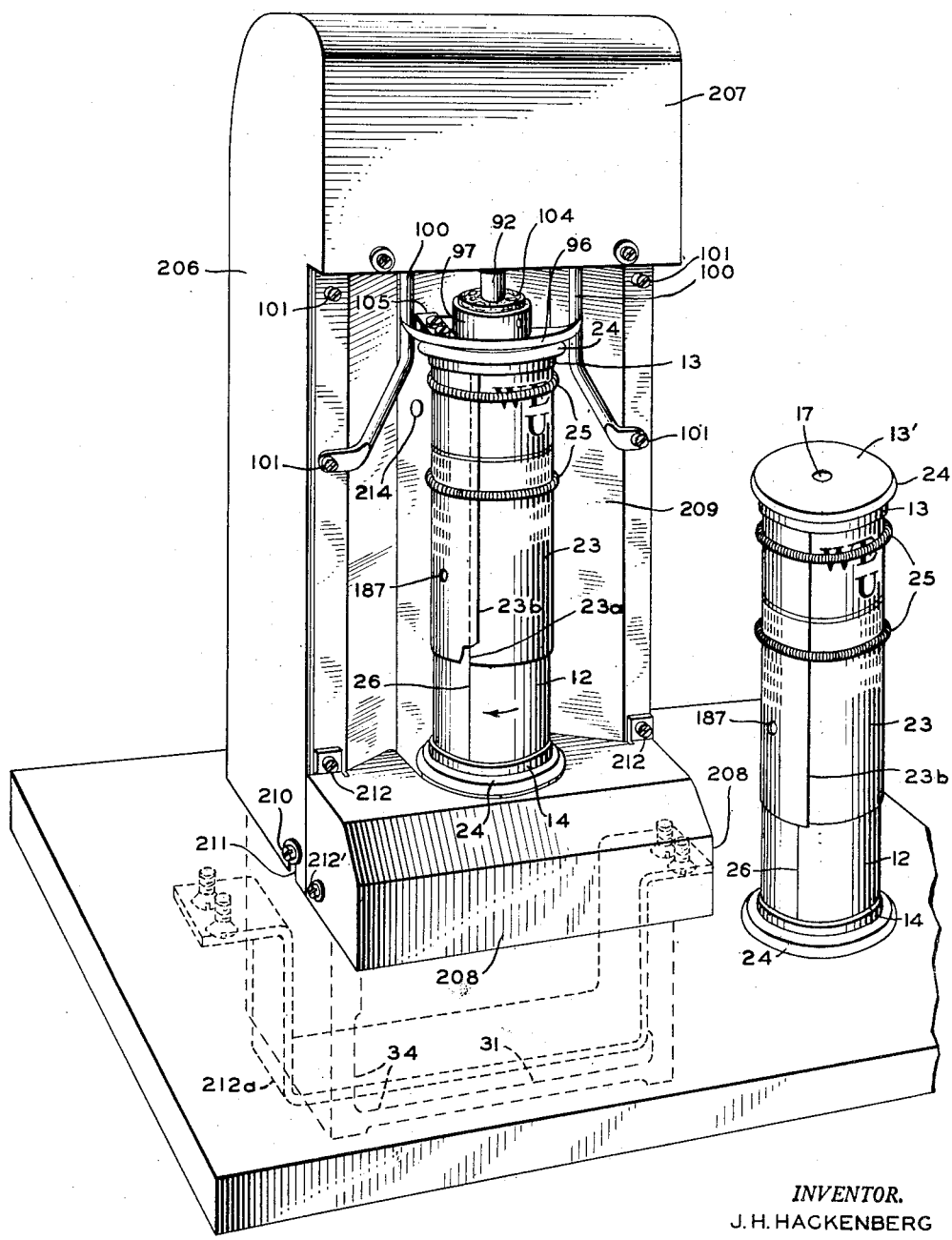
Fig. 1 shows the machine in perspective.

The end disks 13 and 14 are provided with peripheral flanges 24 which perform a safety function in the handling of the drum. As shown in Figs. 1 and 5, the message blanks 23 are held on the drum by spring garters 25 which are made of fine wire coils so as to roll easily over the paper. The flanges 24 extend beyond the garters 25, so that accidental dropping of the drum will prevent damage to the garters. An additional function of the flanges 24 during the insertion of the loaded drum into the machine will be described later on. In wrapping a sheet around the drum, the operator places the left edge 23a (Fig. 1) on a line 26 marked lengthwise on the drum, as by cutting a thin groove and filling it with a suitable pigment. The right edge 23b of the sheet overlaps the left edge because in this machine the drum rotates from right to left as seen from the front, or clockwise as viewed from the top. After the sheet has thus been wrapped around the drum, the spring garters 25 are rolled over it to hold it firmly in place.

As previously mentioned, one of the objects of this invention is to provide novel mountings for the drum whereby the mere insertion of the drum into the machine automatically connects it with the driving mechanism. How that is accomplished will now be described.

All parts of the transmitter are mounted directly or indirectly on a narrow upright frame which is preferably a single casting of aluminum as shown in Fig. 17. This casting comprises a pair of sides 27 and 28, a top piece 29, a partition 30, and a base plate 31. The top 29 is provided with an integral bracket 32 for a purpose to be presently explained. The tall narrow chamber 33 between the cross pieces 29 and 30 provides room for the optical scanner and the vertical drum, while the bottom chamber 34 of the casting accommodates the driving mechanism for the scanner and the lower mounting of the drum.

*The drum mounting and drive connections*

Referring to Fig. 13, there is a vertical shaft journalled in the cross plates 30 and 31 of the main casting. The conical top 35' of shaft 35 is shaped to fit into the pivot socket 18 on the bottom of drum 12. On the upper portion of shaft 35 is fixed a sleeve 36 which carries a collar 37. A drive pin or taper pin 38 secures the parts 36 and 37 to the shaft 35. A disk 39 is attached to the top of sleeve 36 by a forced fit or otherwise, so that the disk 39 always rotates with shaft 35. As best shown in Fig. 14, the disk 39 is cut away to provide a segmental gap or opening 40 of considerable width.

In the space between the collar 37 and the disk 39 there is a short arm 41 rotatably mounted on sleeve 36 by means of a hub 42 from which the arm projects as an integral extension. The arm 41 carries a pin 43 arranged to engage the radial shoulder 40' of disk 39, as seen in Fig. 14. Underneath the disk 39 there is a strong contractile spring 44 which is fastened at one end to a stud 45 on disk 39 and the other end of this spring is attached to a loop or hook 46 on arm 41, as shown in Fig. 15. The pull of spring 44 holds the pin 43 against the shoulder 40' of the disk 39. It is clear from this that the spring 44 constitutes a resilient connection between the shaft 35 and the arm 41.

Still referring to Figs. 13, 14 and 15, the arm 41 carries a heavy pin 47 which is slidably mounted in a hole 48 of the arm and is normally pushed up through the segmental recess 40 of disk 39 by suitable spring means. The lower end of pin 47 carries a cross bar 49 which is connected at its ends to a pair of contracting coil springs 50 (see Fig. 4). The upper ends of these springs are secured to a pair of side lugs 51 projecting from the arm 41. The cross bar 49 limits the upward movement of pin 47 which is so arranged as to extend freely into the annular channel 19 in the bottom disk 14 of the drum (Fig. 13). It is apparent from Figs. 14 and 16 that when the pin 47 on the rotating arm 41 engages the block 20 in the drum channel 19, the drum is coupled to the drive shaft 35 through the resilient connection 44. I shall have more to say about this after describing the drive connections for shaft 35.

The reason for supporting the pin 47 in a depressible mounting is this. Since the drum can be inserted in any angular position, it may happen that the block 20 will come directly over the pin 47. In that event the pin will be depressed so as not to interfere with the proper insertion of the drum. When the arm 41 starts to rotate (as will be described later on), the pin 47 slides from under the block 20 and snaps up into the recess 19 of the stationary drum in position to encounter the block 20 as the arm continues to rotate.

Below the partition or cross plate 30 of the main casting, as shown in Fig. 13, the vertical shaft 35 has mounted thereon a drive unit comprising a sleeve 52 rotatable on the shaft, a worm gear 53 secured to the lower end of the sleeve, and a ratchet wheel 54 fastened to the upper end of the sleeve. A collar 55 holds the drive unit in place. As shown in Figs. 4 and 11, the worm gear 53 is in mesh with a worm 56 on the shaft 57 of a synchronous motor 58 mounted in the bottom chamber 34 of the main casting. The motor is attached to the right panel 28 of the casting by screws 59 (Fig. 6). It will be clear from the foregoing that the drive unit 52—53—54 is permanently geared to the motor and is normally free to rotate on shaft 35.

The driving connection between shaft 35 and gear 53 is effected through the ratchet wheel 54 by a clutch assembly 60 frictionally mounted on sleeve 52 so as to be capable of remaining stationary while the sleeve rotates. Referring to Figs. 4 and 13, this clutch assembly comprises a yoke 61 which fits halfway around the shaft 35, a semicircular friction washer 62 arranged opposite the yoke 61, and a strong coil spring 63 for holding the washer (usually of felt) pressed against the shaft. The spring 63 is attached at its ends to lugs 64 on yoke 61. This particular form of friction clutch is old and any other kind of slip clutch may be used.

The yoke 61 has a slotted arm 65 (Fig. 21) which may be an integral extension of the yoke. The slotted end of arm 65 carries a cross pin 66 on which a pawl or trigger 67 is pivoted. A torsion spring 68 is attached to the cross pin 66 and passes under the trigger 67 (Fig. 4) to rock it into locking engagement with the peripheral teeth of the ratchet wheel 54. Assuming that the trigger 67 connects with the ratchet wheel 54, it is obvious that the trigger is locked to the motor driven sleeve 52 by a direct mechanical connection. The function of trigger 67 is to couple the drum shaft 35 to the motor 58 at the phasing moment of the machine, as will now be described.

Referring to Figs. 4, 18, 19 and 20, an angle bracket 69 secured to the side wall 27 of the main casting supports an electromagnet 70 which is the phasing magnet of the machine. The bracket 69 is attached to the casing by screws 71 and the magnet is fastened to the bracket by screws 72. The base of magnet 70 projects into an opening 73 of the casting so as to permit disposal of the magnet assembly within a minimum space. A bracket 74 is attached to the rear side of the magnet frame by screws 75 and is provided with a pair of lateral flanges 76 (see Fig. 8) which support a pin 77 as a pivot mounting for the armature bar 78.

A U-shaped strip 79 is secured to the rear end of the armature 78 and has lateral ears or lugs 80 (Fig. 8) through which the pin 77 passes loosely so that the armature is free to rock about the pin. A contractile spring 81 is connected at one end to a lug 82 on plate 74 and at the other end to an extension 83 of the armature. The lug 82 may be held in place by one of the screws 75 (Fig. 19). The constant tendency of spring 81 is to rock the armature 78 away from the magnet and this movement is limited by a stop 84 arranged to engage an adjustable screw 84' on the armature bar 78. The stop 84 is shown in Fig. 19 as an integral angular flange formed on the plate 74, but it may be a separate piece adjustable to control the amount of travel of the armature. When the magnet 70 is energized, the armature 78 is rocked against the magnet (Fig. 18) and this movement of the armature is limited by an adjustable screw 85, which is a non-magnetic stop to maintain a small air gap between the armature and the polar faces of the magnet, so that the residual magnetism will not freeze the armature in closed position after the current is shut off.

As shown in Fig. 20, the armature bar 78 is formed at its free end with an inclined edge 86 which ends in a square shoulder 87 adapted to receive a projection or tooth 88 on the trigger 67 when the magnet 70 is not energized. This will be clear from Figs. 4 and 19. The inclined edge 86 on the armature guides the trigger tooth 88 against the locking shoulder 87 which holds the trigger out of contact with ratchet wheel 54 against the action of torsion spring 68. In other words, as long as the magnet 70 is not energized, the friction clutch 60 is held stationary by the interlocking of trigger 67 with the armature 78 while the ratchet wheel 54 is being rotated by the motor 58.

When the magnet 70 is energized, its armature releases the trigger 67 (Fig. 18) which is instantly thrown into engagement with the ratchet wheel 54 by the spring 68. The trigger now rotates with the motor driven ratchet wheel as a peripheral projection thereof. However, the drum shaft 35 remains disconnected from the ratchet wheel 54 until the trigger 67 strikes a dog 89 fixed on the drum shaft. The dog 89 is shown as an extension on a block or collar 90 secured on shaft 35 by a set screw 91 (Fig. 13) by which the angular position of the dog can be properly adjusted.

Referring to Fig. 18, where the armature 78 is shown in operated position and the trigger 67 is in engagement with the ratchet wheel 54, it will be seen that when the trigger strikes the clutch dog 89 (as indicated at 67'), the drum shaft 35 becomes coupled to the synchronous motor 58 through the driving unit 52—53—54. Consequently, when the pin 47 on arm 41 strikes the block 20 on the bottom of the drum (see Fig. 16), the drum is coupled to the shaft 35 through the spring 44 which takes up the shock of the coupling.

Since the vertical drum 12 is driven at its lower end by a live center assembly on the shaft 35, the upper end of the drum need only be supported by a dead center, which is shown in Fig. 12 as a pivot pin or shaft 92 mounted reciprocably in the top bracket 32 of the main casting. The shaft 92 does not rotate, for its function is merely to hold the drum centralized. An expanding coil spring 93 constantly tends to push the shaft 92 downward so that the conical end 92' of the shaft rests firmly in the bearing socket 17 of the drum. The spring 93 also holds the socket 18 on the bottom of drum 12 pressed against the pivot point 35' of shaft 35. An adjustable collar 94 on shaft 92 permits regulation of the spring pressure to the desired degree. When there is no drum in the machine, the downward movement of shaft 92 under the action of spring 93 is limited by a stop 95 on bracket 32 below the collar 94. The stop 95 is preferably a felt washer to deaden the noise.

I have made special provisions for simplifying the insertion of the drum by guiding it toward its central position. For this purpose the pivot shaft 92 carries a guide flange 96 secured to the lower end of the shaft by means of a collar 97 which is fixed on the shaft by a drive pin or taper pin 98. The flange 96, which is fastened to the underside of collar 97 by rivets 99, is a piece of sheet metal in the shape of a half disk that extends forward and flares upward along its edge, as best shown in Figs. 1, 10 and 12. Co-operating with the flange 96 are two guide rods 100 arranged on opposite sides of the flange and converging toward it, as seen in Fig. 1. The rods 100 are attached at their lower ends to the sides of the main casting by screws 101, and the top ends of the rods may simply enter holes or recesses 102 (Fig. 3) in the underside of the top plate 29 of the casting.

Looking at Fig. 1, it will be apparent that when the top edge of the drum strikes either rod 100, it will be automatically guided toward the projecting flange 96 which will be pushed up and guide the drum to central position for receiving the pivot end 92' of shaft 92. Let it be noted here that in this operation of inserting a message bearing drum, the flanges 24 (particularly that of the top disk 13) assist in guiding the drum into position by providing a smooth surface to glide over the flange 96 and the guide rods 100. While the drum is being inserted, the flanges 24 also provide protection for the message blank and prevent the spring garters 25 from being shifted out of position. With a little practice the operator can insert the drum in a moment without even looking at the machine. The upward movement of shaft 92 when the operator pushes the drum against the flange 96 is limited by the collar 97 striking the lower bearing 103 of the slidable shaft 92. A felt washer 104 on collar 97 deadens the noise of this operation. As seen in Fig. 10, the rods 100 extend adjacent to the ends of the guide disk 96 and act as stops to prevent rotation of the dead center 92 without interfering with its slidable movements. A suitable brake 105 is mounted on the guide disk 96 and presses against the flat smooth top of the drum to act as a steadying friction load thereon, to ensure that the drive pin 47 is firmly engaged against the block 20 (Fig. 16) at all times.

Let it be noted that the reciprocable dead center 92 of the drum occupies three different vertical positions. First, its normal or lowermost position occurs when there is no drum in the machine and the collar 94 rests on the stop washer 95, as shown in Fig. 3. The uppermost position of shaft 92 occurs when the operator pushes a drum against the guide disk 96 and thereby lifts the shaft until the washer 104 strikes the bearing 103. The third position of shaft 92 is intermediate of its two extreme positions and represents the operative or drum holding position as shown in Fig. 12. In Fig. 11A the dotted outlines 94a and 94b of collar 94 correspond to the lowest and highest positions of shaft 92, while the full-line showing of collar 94 represents the drum holding position of the shaft.

I utilize the various positions of shaft 92 to control a suitable switch 106 mounted on the top plate 29 of the main casting. The construction of this switch is immaterial and it is sufficient to say that it has a pair of normally open contacts 107 (see Fig. 3) which are closed by a pivoted arm 108 outside the switch casing. The free end of arm 108 carries a roller 109 arranged in the path of a pin 110 projecting from the collar 94 on shaft 92. The arm 108 normally hangs in position to keep the switch open. When the shaft 92 is in normal or lowermost position, the pin 110 is below the roller 109 and the switch 106 is open. The same is true when the shaft 92 is in uppermost position, for then the pin 110 is above the switch arm 108.

When a drum is inserted and the shaft 92 is pushed up, the pin 110 moves past the roller 109 from position 110a in Fig. 11A to position 110b, whereby the switch arm 108 is momentarily operated to close the switch 106. However, this brief closing of the switch has no effect on the machine for reasons that need not be explained here because the circuits controlled by switch 106 are not a part of the present invention. It is only when the drum is in proper position in the machine that the switch 106 is held closed by the pin 110 to keep the power on the machine, as indicated schematically in the circuit diagram, Fig. 6A. Actually, one or more control relays are interposed between switch 106 and the power lines, but that is not a part of this invention. It will be understood, then, that unless a drum is in the machine, the power is cut off and the mere insertion of the drum automatically connects the machine to its local source of power.

When inserting a loaded drum, the operator need pay no attention to the angular position of the drum, because it will always start to rotate in less than one turn of shaft 35 after the trigger 67 has been released by the phasing magnet 70 and become coupled to the clutch dog 89. There is a fixed angular relation between the dog 89, the pin 47 and the overlap of the mounted blank. As previously explained (see Fig. 1), the right edge of the mounted blank coincides with the longitudinal line 26 on the drum and that line is in fixed relation to the block 20. In this case (see Fig. 16) line 26 is in the radial plane of the forward edge 20' of block 20 but those two elements may be placed in any other fixed relation. The point to bear in mind is that when the driving pin 47 strikes the block 20, the message sheet is always in the same angular position relative to the driving pin.

It will be clear from the foregoing explanation that when the phasing magnet 70 is energized, the released trigger 67 will engage the dog 89 in less than one turn of the ratchet wheel 54 to start rotation of shaft 35, and in less than one turn of this shaft the pin 47 will strike the block 20 to start the drum rotating. Of course, the particular angle through which the shaft 35 turns before the pin 47 picks up the drum depends on the angular position of block 20 when the drum is inserted. But in any case that angle will always be less than 360°. This slightly variable time interval (exceedingly small) between the operation of magnet 70 and the start of drum 12 by the pin 47 is immaterial in the proper phasing of the transmitter with the connected receiver. Since the clutch 60 is of the positive action type, the phasing error is in no way dependent upon what might be a variable friction between the driven sleeve 52 and the clutch assembly.

*The optical scanning mechanism*

The parts that comprise the optical scanner of my machine are mounted on a slidable carriage SK which is shown separately in Figs. 22 to 24 as a sheet metal frame construction to support the various parts in operative relation. This carriage frame comprises two main plates, a right-angled front plate 112—113 and a side plate 114 which is welded to the angular section 113 of the front plate. In the angle of the front plate is secured a tube 115, as by brazing it along the sides at 115'. The tube 115 contains a pair of bushings 116 for slidably mounting the carriage on a vertical guide rod 117. This rod is fixed at its ends in the horizontal plates 29 and 30 of the main casting, as shown in Figs. 5 and 13.

Again referring to Figs. 22-24, a right-angled bar 118—119 is welded to the side plate 114 and to an integral lug 120 on plate 112. A depending bracket 121 is welded to the front arm 118 and is provided at its ends with lateral flanges 122 for a purpose that will appear later. An angular metal strap 123 (Fig. 10) is attached to the arm 118 by screws 124 which enter holes 125 in bracket 121 (Fig. 23). The strap 123 is spaced from the arm 118 to receive a stay shaft 126 which is supported by the horizontal plates 29 and 30 of the main casting in parallel relation to the guide shaft 117. A bolt 127 in the ends of arm 118 and strap 123 permits regulation of the space between them for easy sliding movement along the shaft 126, whereby the scanning carriage SK is prevented from twisting about the shaft 117 as it slides up and down.

Referring to Fig. 9, a condenser or projecting lens tube 128 is mounted in a slanting position on the side plate 114 of the carriage by means of screws or bolts 129 which pass through holes 130 in the plate (Fig. 24). The tube 128 is brazed to a cross piece 131 which has slots 132 for the bolts 129, whereby the tube is adjustable axially with respect to the drum 12 for focusing the scanning beam on the message blank. On the upper end of condenser tube 128 is fixed a right-angled bracket 133, which is soldered or brazed to the tube as a rigid extension thereof. A plate 134 is secured to bracket 133 (Figs. 5, 9 and 10) and carries a socket or mounting 135 for an exciter lamp 136, the axis of the socket extending at right angles to the axis of the lens tube 128.

Attention is called to the fact that this novel assembly of condenser tube and exciter lamp constitutes a rigid unit in which the lamp 136 (preferably of the pre-focused type) is permanently in correct relation to the axis of the lens barrel. Therefore, the mere insertion of the lamp in socket 135 automatically assures its axial alignment with the lens tube 128 to throw a partially focused spot of light 137 (Fig. 9) on the message blank 23. This unitary mounting of lamp and projector eliminates the lamp alignment problem found in prior optical scanners and simplifies the maintenance of the machine. Also, it should be noted that the lamp 136 is in an easily accessible position for instant removal and replacement.

Referring to Fig. 9, there is a pickup lens tube 138 mounted on the carriage plate 114 in axial alignment with the lighted area 137. The pickup tube 138 is brazed to a cross piece 139 which is fastened to the plate 114 by bolts 140 passing through slots 141 in the cross piece. In Fig. 24, the two holes located at 142 in plate 114 are for the bolts 140. This bolt and slot mounting permits axial adjustment of tube 138 to correct position, so that an image of the lighted area 137 is focused on the center of target 138' at the end of tube 138 (Fig. 9).

The third optical unit mounted on the carriage frame is a photocell assembly PH comprising a photocell 143 enclosed in a shield 143a, which has a hole 143' arranged to receive the light passing through the aperture in target 138' of the pickup tube 138. As is well understood, the light pulses coming from the scanning spot 137 and delineated by the aperture in the center of target 138' are translated by the photocell 143 into corresponding electrical signals transmitted to the connected receiver. The photocell 143 is removably secured in a vertical position to a horizontal platform 144 which is formed integral with a rear extension of arm 145 on carriage plate 114. This construction of platform 144 and arm 145 as integral parts of plate 114 appears clearly in Figs. 22 to 24. The photocell 143 is attached to the platform 144 in any practical way as by means of a socket 143b of the type commonly used with miniature vacuum tubes.

It is thus seen that the carriage plate 114 constitutes a unitary support for the three optical units of the scanning mechanism—namely, the projector 128 (with the exciter lamp 136), the pickup tube 138 and the photocell 143. Therefore, once these parts are properly adjusted they remain that way. As will presently appear, there is a special practical advantage in mounting the photocell with its axis parallel to the direction of movement of the slidable scanning carriage SK.

Referring to Figs. 3, 5 and 10, a small motor 146 is mounted on the back of carriage plate 112 by screws 147. The holes for these screws are located at 148 in Fig. 23. On the end of motor shaft 149 is fixed a toothed disk 150 which interrupts the light beam as it passes from tube 138 to photocell 143. It is well understood that these light interruptions create a carrier current of desired frequency for transmitting the signal impulses to the receiver.

To protect the photocell 143 still further from stray light, a shield 151 is placed near it between the pickup tube 138 and the light chopper disk 150, as shown best in Fig. 9A. The shield 151 is shaped angularly to fit around the photocell 143 and is attached to the carriage plate 114 by screws 152. A small aperture 153 in shield 151 allows the passage of the light beam from lens tube 138 to the photocell 143.

Figure 2:
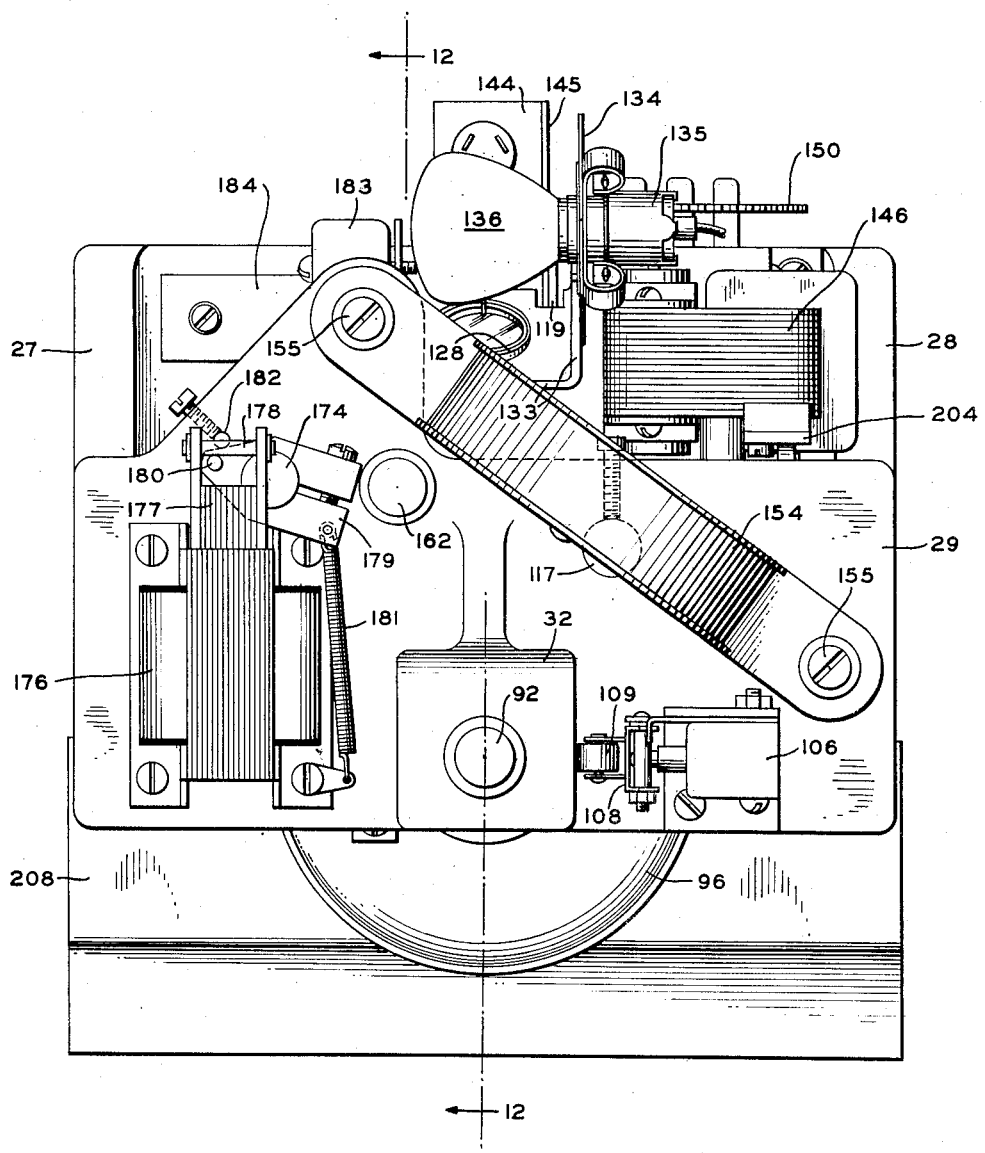
Fig. 2 is a top plan view with the cover removed.

The scanning carriage SK is suspended from a spring drum 154 mounted on the top of the main casting in an angular position by screws 155 as shown in Figs. 2 and 5. The holes for the screws 155 are located at 156 in Fig. 17. The spring drum 154 is a device of well known construction and requires no description. It suffices to say that the drum casing contains a strong spiral spring of metal tape attached at its free end 157 (Fig. 5) to a loop 158 which hooks over a lateral arm 159 (Figs. 22 and 23) welded to the top of the carriage plate 114. Of course, the spring drum 154 can be attached to the scanning carriage in any other practical way.

The normal tension of spring drum 154 is to pull the scanning carriage up and hold it in its highest position, as shown in Figs. 3 and 5, where a stop 160 on the carriage engages a bumper 161 on guide shaft 117. The stop 160 is shown as a lateral flange on the top of carriage plate 112, as can be seen in Figs. 22 to 24. During the downward scanning movement of carriage SK (by connections to be presently described) the spring drum is automatically wound up, so that when the carriage is released it is instantly snapped back by the tensioned return spring to normal position against the silencing bumper 161.

It will now be clear why the mounting of the photocell 143 in vertical position—that is, parellel to the direction in which the scanning carriage SK moves—has a distinct practical advantage. When the carriage is quickly pulled back by the spring drum 154, the sudden stopping and rebound of the carriage subject the photocell to a considerable shock. However, the photocell being in a position to take this shock in the direction of its axis, the effect of the shock in the elements of the cell is minimized. As a result, the life of the photocell is greatly prolonged.

The carriage SK is driven downward during a scanning operation by a feed screw 162 which is journalled at its ends in the plates 29 and 30 of the main casting, as shown in Figs. 3 and 13. On the lower end of feed screw 162 is fixed a large gear 163 which is in permanent mesh with a pinion 164 secured to the drum shaft 35 by a set screw 164'. Therefore, the rotation of shaft 35 is always accompanied by rotation of the feed screw 162. The carriage is connected to the feed screw by a half-nut 165 (Figs. 3 and 12A) which is secured by screws 166 to the upper end of a strong spring blade 167. This spring is secured at its lower end to a block 168 by screws 169 and the block is mounted on the lower end of carriage plate 114 by screws 170. The normal tension of spring 167 is such that it holds the half-nut 165 in firm driving engagement with the feed screw 165.

Referring to Figs. 12A and 12B, there is a pair of arms 171 attached to the sides of the half-nut 165 by screws 172, and the free ends of these arms carry a roller 173 arranged to be engaged by a rotary cam shaft 174 which is supported in the casting plates 29 and 30. As clearly shown in Fig. 13A, the cam shaft 174 has a cut-away section 174' on which a semi-cyclindrical cam rod 175 is mounted by screws 176. It will be convenient to refer to the composite shaft 174—175 as the cam shaft 174, which is normally in the position shown in Fig. 12A where the half-nut 165 engages the feed screw 162. When the cam shaft 174 is swung 90° (or somewhat less) to the position shown in Fig. 12B, it engages the roller 173 and moves the half-nut 165 clear of the feed screw. This releases the carriage for instant return by the spring drum 154 at the close of a scanning operation.

I shall now describe how the cam shaft 174 is operated to disengage the half-nut 165 from the feed screw 162. On top of the main casting is mounted a solenoid 176 which has a movable plunger 177 provided with a cross pin 178 (Fig. 2). The top of cam shaft 174 extends above the casting plate 29 and has an arm 179 fixed thereon. One end of this arm carries an upright stud 180 arranged to be engaged by the cross pin 178 on the solenoid plunger 177. A contracting coil spring 181 attached to arm 179 normally holds the latter against a stop 182, as shown in Fig. 2. The cam shaft 174 is then in the position shown in Fig. 12A. When the solenoid 176 is energized, the plunger 177 is pulled in and the pin 178 swings the arm 179 (and therefore the cam shaft 174) leftwise to the position shown in Fig. 12B. Upon release of solenoid 176, the spring 181 actuates the parts back to normal position.

It is clear, then, that the scanning carriage SK is operatively connected to the feed screw 162 by the half-nut 165 as long as the solenoid 176 remains unenergized. This is the condition of the solenoid during a scanning operation, so that the carriage moves slowly downward to carry the optical scanning spot 137 in a vertical line over the message on the drum, which is rotating rapidly at a predetermined speed. Not until the entire message has been scanned is the solenoid 176 energized to release the carriage for return to start position.

The automatic operation of solenoid 176 at the proper moment is effected by a switch 183 (Figs. 6 and 13) adjustably mounted on an angle bracket 184 suitably secured to the casting plate 30. The switch 183, which may be of any approved construction, has an arm 185 extending into the path of the carriage plate 114. Normally the switch 183 is open, but when the carriage completes its full downward travel the bottom edge 186 of the carriage (Figs. 6 and 6A) strikes the arm 185 and closes the switch, thereby energizing the solenoid 176 and releasing the carriage, as previously described. In the circuit diagram of Fig. 6A, I have simplified the connection between the solenoid and the half-nut to avoid mechanical details.

The operation of switch 183, which may be called the end-of-message switch, takes place only after the entire message sheet 23 on the drum has been scanned. This assumes that the sheet carries a long message which goes practically to the bottom of the sheet. However, where a sheet has only a short message, it would be a waste of time and power to scan the blank space below the message. To prevent this wasteful operation, the attendant punches a hole in the blank slightly below the last line of the message, as indicated at 187 in Fig. 1. This hole exposes the metal of the grounded drum and is utilized to cause operation of the half-nut solenoid 176 in the following manner.

Referring to Figs. 7 and 12, there is a vertical shaft 188 rotatably mounted on the flanges 122 of bracket 121 attached to the arm 118 of the carriage frame. Collars 189 and 190 fixed to shaft 188 above and below the flanges 122 hold the shaft against axial displacement. The lower collar 190 is an insulating sleeve or bushing on which a split metal block 191 is held in correct angular position by a set screw 192 (Fig. 12C). A terminal screw 193 (Fig. 7) on the rear of block 191 connects a conductor 194 to the block. The set screw 192 also serves to support a contactor 195 which is a piece of spring wire so bent that its free end engages the message sheet on the drum in light pressure contact.

When the tip of contactor 195 encounters the hole 187 in a short message sheet, it makes contact with the metal of the drum and thereby closes the circuit of solenoid 176, as will be clear from the diagram of Fig. 6A. In other words, the short message contactor 195 takes the place of the end-of-message switch 185 to release the carriage before it reaches the end of its full downward travel. The solenoid 176 stays energized long enough to allow the carriage to return to normal position. During this return movement the roller 173 rides over the cam rail 175, which is sufficiently long to keep the half-nut 165 away from the feed screw 162 throughout the upward travel of the carriage. Should the operator forget to punch a hole in a short message sheet, the contactor 195 will not operate and the carriage will continue to move down until the switch 185 is operated.

In addition to its electrical function of energizing the half-nut solenoid 176, the drum contactor 195 performs the mechanical function of pressing down the overlap of the blank wrapped around the drum. This overlap can be seen in Fig. 1, and Fig. 9 shows that the contactor 195 engages the blank at a point near the scanning spot 137. Therefore, the spring pressure of wire 195 on the paper holds the latter pressed against the drum, especially along the overlap, so that clear scanning is assured.

Because the contactor 195 is a thin wire which presses against the paper during the scanning operations, the end of the wire wears out in a comparatively short time, so that these contactors require rather frequent renewal. To permit a quick and easy replacement of a worn contactor, I mount the wire on a flat slotted plate 195' (Figs. 3 and 12D) which is clamped by the screw 192 to the block 191. By simply giving the screw 192 a turn or two, the plate 195' can be slid out to remove a worn contactor and a new one slid into place. This can be done in a few seconds without disturbing any part of the machine.

As shown in Fig. 9, a message sheet is held on the drum by the spring garters 25, which are initially placed on opposite sides of the scanning spot 137, so that the scanned section of the sheet is held firmly in contact with the cylindrical surface of the drum. As the scanning carriage moves down, it is necessary to shift the garters downward along the drum so as to keep them in the same relation to the scanning spot 137. I accomplish this automatic shifting of the garters by means of two spaced fingers 196 fixed on the vertical shaft 188. These fingers are so shaped at their free ends as to engage the garters and roll them along the drum with the down movement of the carriage. This will be clear from Figs. 9 and 12A. The ends of fingers 196 do not actually touch the blank on the drum but just clear it.

It is necessary to move the contactor 195 and the garter pushing fingers 196 away from the drum during the return movement of the released carriage. For this purpose, I provide the following mechanism. The top collar 189 on shaft 188 carries an arm 197 (Fig. 3) which is normally held against a stop 198 by a spring 199. The stop 198 is a small angle bracket welded to the arm 118 of the carriage frame, as shown in Fig. 23. It is clear that the engagement of arm 197 with stop 198 determines the normal angular position of shaft 188 and that in turn determines the normal operative position of contactor 195 and the garter pushers 196.

Referring to Figs. 3, 12 and 12A, there is a bracket 200 secured to the front side of the half-nut 165 over the adjacent arm 171 by means of the screws 172. The bracket 200 carries a rigid vertical rod 201 which extends slightly above the upper finger 196 and stands directly in front of the elements 195 and 196 carried by the rocking shaft 188. In other words, the rod 201 is rigidly mounted on the half-nut 165 and always moves with it. Therefore, when the solenoid 176 is energized and operates the cam shaft 174 to move the half-nut away from the feed screw 162, the rod 201 engages the top finger 196 and rocks the shaft 188 so that both fingers 196, as well as the contactor 195, clear the garters 25 on the drum. This allows the carriage SK to return freely without any part of it touching the drum.

The energizing of solenoid 176 either by switch 183 or contactor 195, as previously described, is accompanied by the automatic deenergizing of the phasing magnet 70 to disconnect the drum shaft 35 from the driving motor 58. The circuits which are controlled by the closing of switch 183 or contactor 195 to release the clutch magnet 70 at the close of a scanning operation, do not belong to the present invention, so I have merely indicated by a rectangle 202 in Fig. 6A a relay control box to which the magnet 70 is connected. It is enough to say here that when either one of the switches 183 or 195 is closed, a relay in box 202 is operated to open the circuit of magnet 70 and stop the drum shaft 35, so that the operator can remove the scanned drum and put in a fresh one. Removal of the drum automatically opens the power switch 106, as explained previously.

In certain facsimile systems employing this transmitter, it may be necessary or advisable to delay the transmission of signals to a connected receiver until the scanning carriage SK has moved down a prescribed distance from start position. In such a case, there is provided a switch 203 (Figs. 6A and 10), which has an arm 203' held in switch closing position by a cam block 204 on the carriage so as to short-circuit the transmission lines L1—L2 until the carriage has traveled a certain distance from start position as determined by the length of the cam block. When the switch arm 203' is released by the cam 204, the switch automatically opens and the amplified signal output in circuit 205 goes over the transmission pair L1—L-2.

The complete machine has three covers, namely, a main cover 206 (Fig. 1) which fits over the casting and has a hood 207 to enclose the parts on top; a gear cover 208 at the base; and a recessed plate 209 to form a wall behind the drum. The cover 206 is secured to the sides of the main casting by screws 210 which pass through slots 211 at the bottom edge of the cover for easy mounting and removal thereof. Similar screws and slots are provided to secure the hooded portion 207 to the top shelf 29 of the casting. The gear cover 208 is fastened to the front edges of the casting by screw 212 and to the sides of the casting by screws 212'. The recessed plate 209 is attached to the front ends of side plates 27 and 28 by the screws 101, two of which also hold the guide rods 100 in place. When the machine is mounted on a table, as shown in Fig. 1, the lower portion may extend below the table, as indicated by the dotted base portion of the casting, to reduce the height of the machine for the operator's convenience. The machine is supported in this lowered position by any practical means, such as a strap 212a secured to the underside of the table and forming a seat for the bottom plate 31 of the casting.

The recessed plate 209, as shown in Figs. 1 and 10, is generally so shaped as to further guide the positioning of the drum so that the latter will fall easily into place where the centers 35 and 92 will engage the recesses in the end disks 13 and 14. The central portion of plate 209 is closely adjacent to the drum and concentric therewith. This concentric section of the plate 209 has a wide vertical slot 213 for the passage of the scanning beam and for allowing the contactor 195 and garter pushers 196 to project through to the drum. To the left of slot 213 in plate 209 there is a hole 214 (Fig. 1) which is in line with the screw 192 (Fig. 3) so that a screw driver can be inserted through the hole 214 to loosen and tighten the screw for replacing a worn contactor with a new one. The slot 213 is wide enough for the operator's manipulation of the contactor in making this replacement.

The machine herein described represents an example of my invention as actually built and commercially operated. It should, therefore, be understood that my invention is not limited to the structural details included in this particular machine, for the novel features defined in the appended claims can be embodied in other practical forms than herein set forth. Further, it is not necessary that all the novel features of this invention be used in the same machine, because certain features can be used to full advantage without others.

I claim as my invention:

1. A facsimile machine having supporting means for a rotary scanning drum which is provided with end disks, said supporting means including a pair of axially spaced members between which the drum is mounted, each disk having a central recess adapted to receive the associated member in a separable engagement, one of said members being spring mounted and axially movable when one end of the drum is manually pushed against it, whereby the other end of the drum is free to engage or disengage said other member for instant insertion or removal of the drum, driving means connected to one of said members, a pin rotated by said driven member, and a coupling element on one of said disks arranged to engage said pin when the drum is inserted in the machine, said coupling element being adapted to separate automatically from said pin when the drum is pushed against said axially movable member for removal.

2. A facsimile machine having a live center and a dead center arranged in vertical alignment for supporting a scanning drum in upright position, said drum being provided with flat end disks having each a central recess in its flat face for receiving said centers in separable supporting engagement, one of said centers being vertically movable for easy mounting and removal of the drum, cooperating coupling elements on said live center and the associated end disk for rotating the drum, the coupling element on said last-named disk being confined within the boundary of the disk, said coupling elements being adapted to separate automatically on removal of the drum, and a source of power for operating said live center.

3. A facsimile machine having a live center and a dead center arranged in vertical alignment for supporting a scanning drum in upright position, said drum being provided with end disks having each a central recess for receiving said centers in separable supporting engagement, one of said centers being vertically movable for easy mounting and removal of the drum, one of said end disks being provided on its face with an annular channel, a block fixed in said channel, a vertical pin rotatably mounted on said live center and projecting into said channel to engage said drum, whereby said pin and block form a driving connection between the live center and the drum, said driving connection being automatically separable on removal of the drum, and a source of power for operating said live center.

4. A facsimile machine having a live center and a dead center arranged in vertical alignment for rotatably supporting a scanning drum in upright position, one of said supporting centers being axially movable for the ready insertion and removal of the drum, said live center including a vertical shaft and an arm mounted on said shaft for rotation therewith, an upright pin carried by said arm, coupling means on one end of said drum adapted to be engaged by said pin for connecting the drum to said shaft, said pin and coupling means being automatically separable when the drum is removed, and means for operating said shaft.

5. A facsimile machine having a scanning drum, a live center and a dead center arranged in vertical alignment for rotatably supporting said scanning drum in upright position, said live center including a vertical shaft with a plate fixed thereon, an arm rotatable on said shaft, a spring for holding said arm against said plate, a vertical pin on said arm arranged to engage the adjacent end of the drum for rotating the same, said spring constituting a resilient connection between said shaft and arm so as to cushion the drum coupling action of said pin, and means for connecting said shaft to a source of power.

6. A facsimile scanning drum constructed to be removably mounted in vertical position, said drum being provided with end disks having each a central recess for receiving a supporting center, one of said disks having a flat face provided with an annular channel, and a driving block removably fastened in said channel substantially flush with the face of the disk, said block having a driving face arranged in a radial plane of the drum.

7. A facsimile machine having a scanning drum, an upper center and a lower center for removably supporting said scanning drum in upright position, said upper center being vertically movable for easy mounting and removal of the drum which has a smooth flat disk at its upper end for engaging the upper center, a forwardly projecting guide member mounted on the upper center and so arranged that upon insertion of the drum said end disk strikes said guide member and thereby lifts the upper center, whereupon said member guides the disk into supporting engagement with the upper center, and driving means connected to one of said centers for rotating the supported drum.

8. A facsimile machine having an upper center and a lower center for removably supporting a scanning drum in vertical position, said upper center being vertically movable for easy mounting and removal of the drum, a guide plate mounted on the upper center and projecting forward in the form of an upturned semi-circular flange which is concentric with the drum and overhangs the same, whereby said flange serves to guide the upper end of the drum into engagement with the upper center, and driving means connected to one of said centers for rotating the supported drum.

9. A facsimile machine having an upper center and a lower center for removably supporting a scanning drum in vertical position, said upper center being vertically movable for easy mounting and removal of the drum, a guide plate mounted on the upper center and projecting forward in the form of an upturned semi-circular flange which is concentric with the drum and overhangs the same, whereby said flange serves to guide the upper end of the drum into engagement with the dead center, a pair of rods converging toward the sides of the semi-circular flange to guide the upper end of the drum toward said flange when the drum is being inserted, and driving means connected to one of said centers for rotating the supported durm.

10. In a facsimile machine, an upright framework providing a vertical chamber which is relatively tall and narrow, a dead center extending downward from the top of said chamber and vertically movable, a live center extending upward from the bottom of said chamber, a scanning drum having end disks provided with means for releasably engaging said centers which support the drum in vertical rotary position in said chamber, a vertically separable coupling between said live center and the bottom disk of the drum, means engaged by the upper end of the drum to lift the dead center when the drum is pushed up, whereby the lower end of the drum is free to engage or disengage the live center for the instant insertion or removal of the drum, and driving connections below said chamber for operating said live center.

11. A facsimile machine having a scanning drum, an upper dead center and a lower live center for rotatably supporting said scanning drum in vertical position, a separable coupling between the live center and the bottom of the drum, means for mounting the upper dead center to permit vertical movement thereof for the easy insertion and removal of the drum, driving means connected to said live center for rotating the drum, and means for automatically energizing said driving means in response to the insertion of the drum.

12. A facsimile machine having a scanning drum, an upper dead center and a lower live center for rotatably supporting said scanning drum in vertical position, a separable coupling between the live center and the bottom of the drum, means for mounting the upper dead center to permit vertical movement thereof for the easy insertion and removal of the drum, a motor for operating said live center, and a switch controlled by the vertical movement of the dead center to energize said motor only when the drum is mounted on said centers, the dead center automatically opening said switch on removal of the drum.

13. A facsimile machine having a scanning drum, an upper dead center and a lower live center for rotatably supporting said scanning drum in vertical position, a separable coupling between the live center and the bottom of the drum, said upper dead center being vertically movable for the easy insertion and removal of the drum, a spring for holding the dead center in lowermost position when there is no drum in the machine, the insertion of the drum automatically lifting the dead center to a position in which it is held by the drum, a motor for operating said live center, a normally open switch in the motor circuit, and means on the dead center for automatically closing the switch when the dead center is raised by the mounted drum, said switch operating means automatically opening the switch when the dead center drops to lowermost position on removal of the drum.

14. In a facsimile machine, an upright framework providing a vertical chamber which is relatively tall and narrow, a dead center extending downward from the top of said chamber and vertically movable, a live center extending upward from the bottom of said chamber, a rotary scanning drum releasably supported by said centers in vertical position, a concave plate mounted in said chamber behind said drum to form a recess for said centers and the supported drum, and scanning mechanism mounted on said framework behind said plate in operative relation to said drum, said plate having a vertical slot through which the drum is scanned.

15. In a facsimile machine, an upright framework providing a vertical chamber which is relatively tall and narrow, a dead center extending downward from the top of said chamber and vertically movable, a live center extending upward from the bottom of said chamber, a rotary scanning drum releasably supported by said centers in vertical position, a concave plate mounted in said chamber behind said drum to form a recess for said centers and the supported drum, a forwardly projecting guide flange on the upper dead center, a pair of rods supported in front of said recess plate for converging toward the sides of said flange, whereby said concave plate cooperates with said rods to guide the upper end of a drum toward said flange as the drum is being inserted, and scanning mechanism mounted on said framework behind said plate in operative relation to said drum, said plate having a vertical slot through which the drum is scanned.

16. In a facsimile machine, a slidable scanning carriage mounted in vertical position, a rotary feed screw for operating said carriage downward in a scanning direction, a half-nut movably mounted on said carriage and normally held in mesh with said feed screw, a vertical rotary shaft provided with a cam along its length, a device supported independently of said scanning carriage for rocking said cam shaft through a predetermined arc, means engaged by said cam in operated position to release the half-nut from the feed screw, and mechanism for returning the released carriage upward to normal position, said cam being sufficiently long to engage said releasing means during the return of the carriage.

17. In a facsimile machine, a slidable scanning carriage mounted in vertical position, a rotary feed screw for operating said carriage downward in a scanning direction, a spring arm mounted at one end on said carriage, a half-nut secured to the free end of said arm which normally holds the half-nut in mesh with said feed screw, a projection carried by said arm, a vertical shaft provided with a cam along its length, means for normally holding said cam shaft out of contact with said projection, a device supported independently of said scanning carriage for rocking said cam shaft against said projection to disengage the half-nut from the feed screw, and mechanism for returning the released carriage upward to normal position, said cam being sufficiently long to engage said projection and hold the half-nut disengaged during the return of the carriage.

18. In a facsimile machine, a slidable scanning carriage mounted in vertical position, a rotary feed screw for operating said carriage downward in a scanning direction, a half-nut movably mounted on said carriage and normally held in mesh with said feed screw, a bracket attached to said half-nut and carrying a roller, a vertical shaft rotatably supported and provided with a cam along its length, a magnet supported independently of said scanning carriage for rocking said cam shaft to bring the cam against said roller and thereby force the half-nut out of contact with the feed screw, and mechanism for returning the released carriage upward to normal position, said cam being sufficiently long to remain in contact with said roller during the return of the carriage.

19. In a facsimile machine, a rotary drum supported in operative position, a spring garter on said drum for holding a message blank wrapped around the drum, a carriage supported for sliding movement, a scanning device mounted on said carriage in operative relation to said drum, a rotary feed screw, a half-nut mounted on said carriage and normally held in mesh with said feed screw for operating the carriage to scan the blank on said drum, a finger movably mounted on said carriage and normally in a position to push said garter along the drum with the movement of the carriage, means for simultaneously disengaging the half-nut from the feed screw and retracting said finger from the garter, and means for returning the released carriage to start position.

20. In a facsimile machine, a slidable scanning carriage, a rotary feed screw for operating said carriage in a scanning direction, a half-nut mounted on said carriage and normally held in mesh with said feed screw, a rotary metal drum supported in operative relation to said carriage, a spring garter on said drum for holding a message sheet wrapped around the drum, a finger for pushing said garter along the drum during a scanning operation, a conducting contactor mounted to engage the bare metal drum through a hole in the message sheet, a cam for moving said half-nut to releasing position, means mounted on said half-nut to retract said finger and contactor as the half-nut moves to releasing position, and means for returning the released carriage to start position.

21. In a facsimile machine, an optical scanning carriage mounted for vertical sliding movement, said carriage having a front plate and a side plate joined together at right angles and forming a vertical corner, a sleeve secured in said corner, an upright post arranged to receive said sleeve to guide the carriage in its up and down movements, and optical scanning elements mounted on said side plate.

22. In a facsimile machine, a rotary scanning drum mounted in vertical position, an optical scanning carriage supported for vertical sliding movement in operative relation to a blank on said drum, said carriage having a vertical side plate provided with a rearward extension which terminates in a horizontal platform, a condenser lens tube mounted on said side plate and slanting downward toward said drum to project a scanning spot on the blank, a pickup lens tube mounted horizontally on said plate below said condenser tube to receive light reflected from the blank, and a photocell mounted in vertical position on said horizontal platform to receive the scanning beam passing through said pickup tube.

23. In a facsimile machine, a rotary drum supported in vertical position, a pair of spring garters on said drum for holding a message blank wrapped around the drum, a carriage slidable up and down, an optical scanning device mounted on said carriage in operative relation to said drum, said garters being arranged on opposite sides of the scanning spot projected on said blank, a vertical rotary feed screw, a half-nut mounted on said carriage and normally held in mesh with said feed screw for operating the carriage downward to scan the blank on said drum, a vertical rotary shaft mounted on said carriage and normally held in a certain angular position, a pair of spaced fingers fixed on said shaft and normally held in a position to push said garters along the drum as the carriage moves down, a vertical cam shaft operable to disengage the half-nut from the feed screw, means movable with the cam operated half-nut to retract said fingers from the garters, and means for returning the released carriage to start position, said fingers in retracted position permitting the free return of the carriage.

JOHN H. HACKENBERG.

References Cited in the file of this patent

UNITED STATES PATENTS

| Number | Name | Date |
|---|---|---|
| 1,039,066 | Nelson | Sept. 17, 1912 |
| 1,059,041 | Davis | Apr. 15, 1913 |
| 2,221,078 | Dotteser | Nov. 12, 1940 |
| 2,255,868 | Wise et al. | Sept. 16, 1941 |
| 2,258,124 | Nichols | Oct. 7, 1941 |
| 2,302,827 | Wise et al. | Nov. 24, 1942 |
| 2,315,361 | Wise et al. | Mar. 30, 1943 |
| 2,339,133 | Artzt | Jan. 11, 1944 |
| 2,469,423 | Wise et al. | May 10, 1949 |
| 2,496,943 | Hutchison | Feb. 7, 1950 |